(12) United States Patent
Fujiwara

(10) Patent No.: US 8,074,441 B2
(45) Date of Patent: Dec. 13, 2011

(54) APPARATUS AND METHOD FOR DETERMINING CATALYST DEGRADATION

(75) Inventor: Takahiko Fujiwara, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1615 days.

(21) Appl. No.: 11/432,404

(22) Filed: May 12, 2006

(65) Prior Publication Data

US 2006/0254257 A1    Nov. 16, 2006

(30) Foreign Application Priority Data

May 16, 2005    (JP) .................. 2005-142319

(51) Int. Cl.
*F01N 3/00* (2006.01)
(52) U.S. Cl. .............. 60/277; 60/276; 60/285
(58) Field of Classification Search ............ 60/274, 60/276, 277, 285, 286
See application file for complete search history.

(56) References Cited

U.S. PATENT DOCUMENTS

| | | | | |
|---|---|---|---|---|
| 5,077,970 A | * | 1/1992 | Hamburg | 60/274 |
| 5,157,921 A | * | 10/1992 | Ito et al. | 60/274 |
| 5,165,230 A | * | 11/1992 | Kayanuma et al. | 60/276 |
| 5,220,788 A | * | 6/1993 | Kurita et al. | 60/274 |
| 5,279,116 A | * | 1/1994 | Shimizu et al. | 60/277 |
| 5,303,548 A | * | 4/1994 | Shimizu et al. | 60/277 |
| 5,647,204 A | * | 7/1997 | Atanasyan | 60/274 |
| 5,737,916 A | * | 4/1998 | Mitsutani | 60/276 |
| 6,349,540 B1 | * | 2/2002 | Nakayama et al. | 60/277 |
| 6,807,806 B2 | * | 10/2004 | Takaku et al. | 60/277 |
| 7,059,120 B2 | * | 6/2006 | Nakagawa et al. | 60/289 |
| 7,412,820 B2 | * | 8/2008 | Iida et al. | 60/274 |
| 2004/0000135 A1 | * | 1/2004 | Uchida | 60/277 |

FOREIGN PATENT DOCUMENTS

| | | |
|---|---|---|
| JP | A 5-312025 | 11/1993 |
| JP | A 6-129285 | 5/1994 |
| JP | A 6-159048 | 6/1994 |
| JP | 07-103039 A | 4/1995 |
| JP | A 10-47141 | 2/1998 |
| JP | A 2002-130018 | 5/2002 |
| JP | 2004-028029 A | 1/2004 |
| JP | 2004-169607 A | 6/2004 |
| JP | 2006-063807 A | 3/2006 |

* cited by examiner

*Primary Examiner* — Tu Nguyen
(74) *Attorney, Agent, or Firm* — Kenyon & Kenyon LLP

(57) ABSTRACT

A target air-fuel ratio of exhaust gas is changed back and forth between rich and lean in short periods, and it is determined that the catalyst is degraded when the air-fuel ratio of exhaust gas is lean by the time a predetermined period of time has passed from the time the target air-fuel ratio started to be changed.

2 Claims, 17 Drawing Sheets

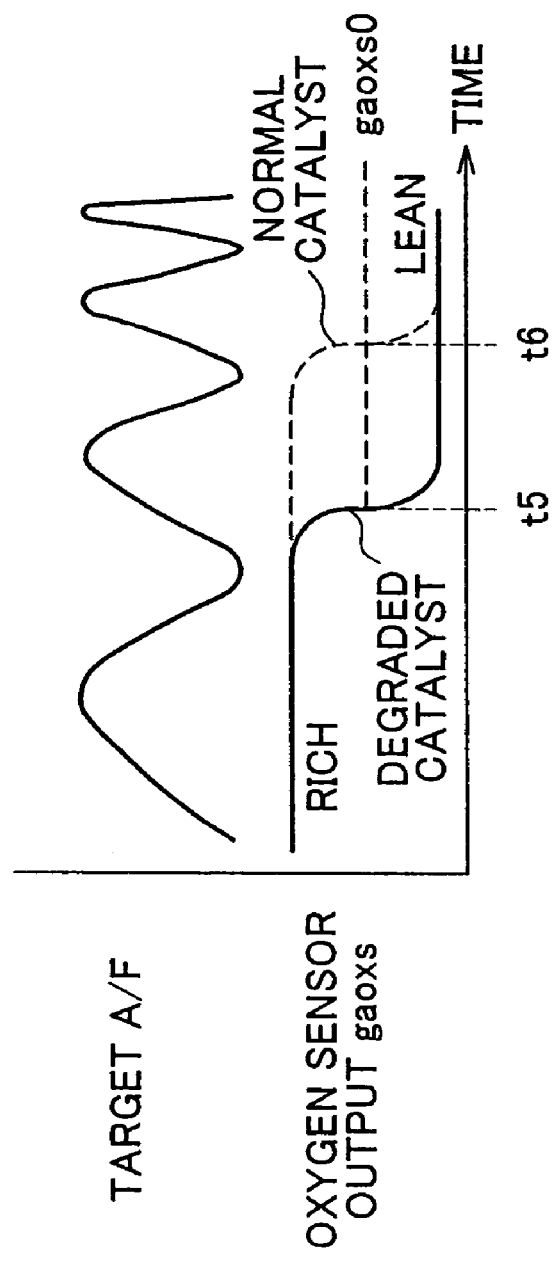

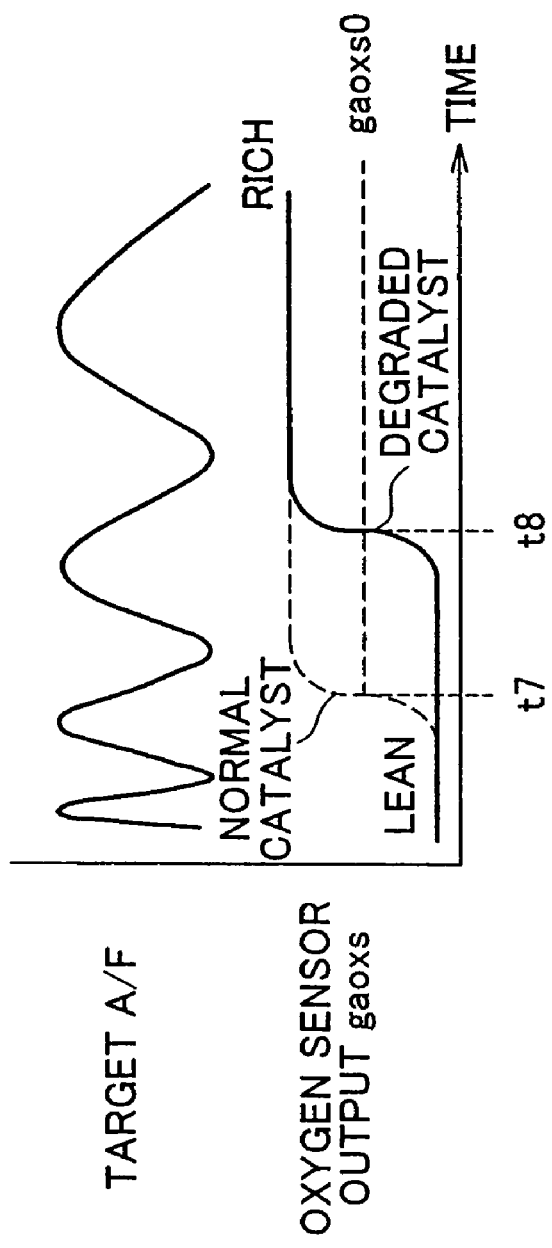

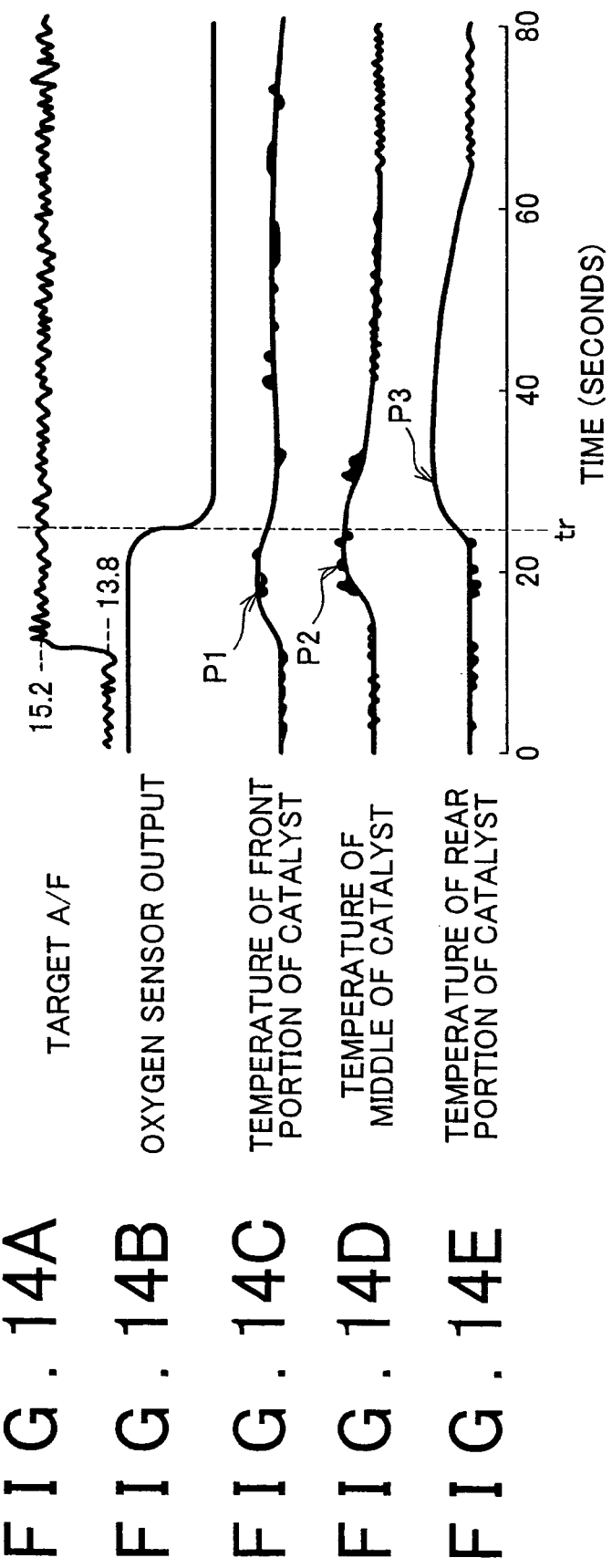

APPARATUS AND METHOD FOR DETERMINING CATALYST DEGRADATION

INCORPORATION BY REFERENCE

The disclosure of Japanese Patent Application No. 2005-142319 filed on May 16, 2005 including the specification, drawings and abstract is incorporated herein by reference in its entirety.

BACKGROUND OF THE INVENTION

1. Field of the Invention

The invention relates to an apparatus and method for determining degradation of a catalyst provided in an exhaust passage of an internal combustion engine.

2. Description of the Related Art

Japanese Patent Application Publication No. JP-A-6-159048, for example, discloses an apparatus which calculates an oxygen storage capacity (OSC) of a catalyst provided in an exhaust passage of an internal combustion engine and then determines degradation of the catalyst based on that calculated oxygen storage capacity. This apparatus calculates the oxygen storage capacity of the catalyst by calculating the amount of excess oxygen or the amount of deficient oxygen in the exhaust gas flowing into the catalyst from the time that a control target value of the air-fuel ratio (hereinafter referred to as "target air-fuel ratio") is changed from rich (or lean) to lean (or rich) until the time that the output of an oxygen sensor downstream of the catalyst reverses.

When degradation of the catalyst progresses, however, the output of the oxygen sensor may reverse before the oxygen absorbing/releasing reaction progresses sufficiently in the mid to rear portion of the catalyst. FIG. 14 is a view showing the change in temperature of that accompanies an oxygen absorbing reaction in the catalyst. FIG. 14A is a view showing settings of the target air-fuel ratio. FIG. 14B is a view showing the change in the oxygen sensor output. FIG. 14C shows the change in temperature at the front portion of the catalyst, FIG. 14D shows the change in temperature at the middle of the catalyst, and FIG. 14E shows the change in temperature at the rear portion of the catalyst. As shown in FIG. 14A, when the target air-fuel ratio is changed from a value of 13.8 on the rich side to a value of 15.2 on the lean side, the oxygen absorbing reaction progresses in the catalyst. The oxygen absorbing reaction in the catalyst is an exothermal reaction. Therefore, as the oxygen absorbing reaction progresses from the front portion to the rear portion of the catalyst, a temperature rise peak (hereinafter simply referred to as "peak") P1 occurs first at the front portion of the catalyst, as shown in FIG. 14C. Next, a peak P2 occurs at the middle of the catalyst, as shown in FIG. 14D, after which a peak P3 then occurs at the rear portion of the catalyst, as shown in FIG. 14D. Thus it is possible to know how far the oxygen absorbing reaction has progressed in the catalyst based on these peaks P1 to P3. As shown in FIG. 14E, the oxygen sensor output reverses (at time tr in the drawing) before peak P3 occurs at the rear portion of the catalyst so the oxygen storage capacity of the entire catalyst is unable to be calculated. As a result, if degradation of the catalyst is determined based on the oxygen storage capacity of the catalyst, it is not able to be made accurately. In addition, a catalyst which has degraded to a large degree is unable to be accurately detected.

SUMMARY OF THE INVENTION

In view of the foregoing problems, this invention thus aims to accurately determine degradation of a catalyst without that determination being based on the oxygen storage capacity of the catalyst.

A first aspect of the invention relates to an apparatus that determines degradation of a catalyst provided in an exhaust passage of an internal combustion engine, including an exhaust gas sensor which is provided downstream of the catalyst and detects whether an air-fuel ratio of exhaust gas is richer or leaner than the stoichiometric air-fuel ratio; an air-fuel ratio controller that changes a target air-fuel ratio back and forth between rich and lean in a period that is shorter than a period which is long enough for a normal catalyst to become saturated with oxygen while the air-fuel ratio of the exhaust gas is kept lean within the same period; and a catalyst degradation determiner which determines that the catalyst is degraded when the exhaust gas sensor detects that the air-fuel ratio is lean by the time a predetermined period of time has passed from the time the target air-fuel ratio started to be changed.

A second aspect of the invention relates to an apparatus that determines degradation of a catalyst provided in an exhaust passage of an internal combustion engine, including: an exhaust gas sensor which is provided downstream of the catalyst and detects whether an air-fuel ratio of exhaust gas is richer or leaner than the stoichiometric air-fuel ratio; an air-fuel ratio controller which changes a target air-fuel ratio of the exhaust gas back and forth between rich and lean in a period that is shorter than a period which is long enough for a normal catalyst to become saturated with oxygen while the air-fuel ratio of the exhaust gas is kept lean within the same period, as well as changes, so as to gradually reduce, a change width of the target air-fuel ratio after a predetermined period of time has passed from the time the target air-fuel ratio started to be changed; an intake air amount calculator which calculates an amount of air drawn into the internal combustion engine from after the change width starts to be changed until the exhaust gas sensor detects that the air-fuel ratio has changed from rich to lean; and a catalyst degradation determiner which determines degradation of the catalyst based on the air amount calculated by the intake air amount calculator.

A third aspect of the invention relates to an apparatus that determines degradation of a catalyst provided in an exhaust passage of an internal combustion engine, including: an exhaust gas sensor which is provided downstream of the catalyst and detects whether an air-fuel ratio of exhaust gas is richer or leaner than the stoichiometric air-fuel ratio; an air-fuel ratio controller which changes a target air-fuel ratio of the exhaust gas back and forth between rich and lean in a period that is shorter than a period which is long enough for a normal catalyst to become saturated with oxygen while the air-fuel ratio of the exhaust gas is kept lean within the same period, as well as changes, so as to gradually increase, a change width of the target air-fuel ratio after a predetermined period of time has passed from the time the target air-fuel ratio started to be changed; an intake air amount calculator which calculates an amount of air drawn into the internal combustion engine from after the change width starts to be changed until the exhaust gas sensor detects that the air-fuel ratio has changed from lean to rich; and a catalyst degradation determiner which determines degradation of the catalyst based on the air amount calculated by the intake air amount calculator.

A fourth aspect of the invention relates to an apparatus that determines degradation of a catalyst provided in an exhaust passage of an internal combustion engine, including: an exhaust gas sensor which is provided downstream of the catalyst and detects whether an air-fuel ratio of exhaust gas is richer or leaner than the stoichiometric air-fuel ratio; an air-fuel ratio controller which changes a target air-fuel ratio of the exhaust gas back and forth between rich and lean in a period that is shorter than a period which is long enough for a normal catalyst to become saturated with oxygen while the air-fuel ratio of the exhaust gas is kept lean within the same period, as well as changes, so as to gradually reduce, a change period of the target air-fuel ratio after a predetermined period of time has passed from the time the target air-fuel ratio started to be changed; an intake air amount calculator which calculates an amount of air drawn into the internal combustion engine from after the change period starts to be changed until the exhaust gas sensor detects that the air-fuel ratio has changed from rich to lean; and a catalyst degradation determiner which determines degradation of the catalyst based on the air amount calculated by the intake air amount calculator.

A fifth aspect of the invention relates to an apparatus that determines degradation of a catalyst provided in an exhaust passage of an internal combustion engine, including: an exhaust gas sensor which is provided downstream of the catalyst and detects whether an air-fuel ratio of exhaust gas is richer or leaner than the stoichiometric air-fuel ratio; an air-fuel ratio controller which changes a target air-fuel ratio of the exhaust gas back and forth between rich and lean in a period that is shorter than a period which is long enough for a normal catalyst to become saturated with oxygen while the air-fuel ratio of exhaust gas is kept lean within the same period, as well as changes, so as to gradually increase, a change period of the target air-fuel ratio after a predetermined period of time has passed from the time the target air-fuel ratio started to be changed; an intake air amount calculator which calculates an amount of air drawn into the internal combustion engine from after the change period starts to be changed until the exhaust gas sensor detects that the air-fuel ratio has changed from lean to rich; and a catalyst degradation determiner which determines degradation of the catalyst based on the air amount calculated by the intake air amount calculator.

A sixth aspect of the invention relates to a method for determining degradation of a catalyst provided in an exhaust passage of an internal combustion engine, including: changing a target air-fuel ratio of exhaust gas back and forth between rich and lean in a period that is shorter than a period which is long enough for a normal catalyst to become saturated with oxygen while an air-fuel ratio of the exhaust gas is kept lean within the same period; detecting an air-fuel ratio of the exhaust gas downstream of the catalyst; and determining that the catalyst is degraded when the detected air-fuel ratio is lean by the time a predetermined period of time has passed from the time the target air-fuel ratio started to be changed.

A seventh aspect of the invention relates to a method for determining degradation of a catalyst provided in an exhaust passage of an internal combustion engine, including: changing a target air-fuel ratio of the exhaust gas back and forth between rich and lean in a period that is shorter than a period which is long enough for a normal catalyst to become saturated with oxygen while the air-fuel ratio of the exhaust gas is kept lean within the same period, as well as changing, so as to gradually reduce, a change width of the target air-fuel ratio after a predetermined period of time has passed from the time the target air-fuel ratio started to be changed; detecting an air-fuel ratio of the exhaust gas downstream of the catalyst; calculating an amount of air drawn into the internal combustion engine from after the change width starts to be changed until the detected air-fuel ratio has changed from rich to lean; and determining degradation of the catalyst based on the calculated air amount.

An eighth aspect of the invention relates to a method for determining degradation of a catalyst provided in an exhaust passage of an internal combustion engine, including: changing a target air-fuel ratio of the exhaust gas back and forth between rich and lean in a period that is shorter than a period which is long enough for a normal catalyst to become saturated with oxygen while the air-fuel ratio of the exhaust gas is kept lean within the same period, as well as changing, so as to gradually increase, a change width of the target air-fuel ratio after a predetermined period of time has passed from the time the target air-fuel ratio started to be changed; detecting an air-fuel ratio of the exhaust gas downstream of the catalyst; calculating an amount of air drawn into the internal combustion engine from after the change width starts to be changed until the detected air-fuel ratio has changed from lean to rich; and determining degradation of the catalyst based on the calculated air amount.

A ninth aspect of the invention relates to a method for determining degradation of a catalyst provided in an exhaust passage of an internal combustion engine, including: changing a target air-fuel ratio of the exhaust gas back and forth between rich and lean in a period that is shorter than a period which is long enough for a normal catalyst to become saturated with oxygen while the air-fuel ratio of the exhaust gas is kept lean within the same period, as well as changing, so as to gradually reduce, a change period of the target air-fuel ratio after a predetermined period of time has passed from the time the target air-fuel ratio started to be changed; detecting an air-fuel ratio of the exhaust gas downstream of the catalyst; calculating an amount of air drawn into the internal combustion engine from after the change period starts to be changed until the detected air-fuel ratio has changed from rich to lean; and determining degradation of the catalyst based on the calculated air amount.

A tenth aspect of the invention relates to a method for determining degradation of a catalyst provided in an exhaust passage of an internal combustion engine, including: changing a target air-fuel ratio of the exhaust gas back and forth between rich and lean in a period that is shorter than a period which is long enough for a normal catalyst to become saturated with oxygen while the air-fuel ratio of exhaust gas is kept lean within the same period, as well as changing, so as to gradually increase, a change period of the target air-fuel ratio after a predetermined period of time has passed from the time the target air-fuel ratio started to be changed; detecting an air-fuel ratio of the exhaust gas downstream of the catalyst; calculating an amount of air drawn into the internal combustion engine from after the change period starts to be changed until the detected air-fuel ratio has changed from lean to rich; and determining degradation of the catalyst based on the calculated air amount.

According to the first and sixth aspects of the invention, by changing the target air-fuel ratio back and forth between rich and lean in short periods, it is possible to make it appear that only the oxygen absorbing reaction is progressing in a degraded catalyst. Thus, catalyst degradation can be determined based on the fact that the air-fuel ratio detected downstream of the catalyst is lean after a predetermined period of time has passed from the time the target air-fuel ratio started to be changed. As a result, catalyst degradation can be accurately determined without the determination being based on the oxygen storage capacity of the catalyst.

According to the second and seventh aspects of the invention, by gradually reducing the change width of the target air-fuel ratio, it is possible to create an environment in which the oxygen releasing reaction does not readily occur in the catalyst. Thus, catalyst degradation can be determined based on the amount of intake air drawn until the air-fuel ratio detected downstream of the catalyst changes from lean to rich under that environment. As a result, catalyst degradation can be accurately determined without the determination being based on the oxygen storage capacity of the catalyst.

According to the third and eighth aspects of the invention, by gradually increasing the change width of the target air-fuel ratio, it is possible to create an environment in which the oxygen releasing reaction readily occurs in the catalyst. Thus, catalyst degradation can be determined based on the amount of intake air drawn until the air-fuel ratio detected downstream of the catalyst changes from lean to rich under that environment. As a result, catalyst degradation can be accurately determined without the determination being based on the oxygen storage capacity of the catalyst.

According to the forth and ninth aspects of the invention, by gradually reducing the change period of the target air-fuel ratio, it is possible to create an environment in which the oxygen releasing reaction does not readily occur in the catalyst. Thus, catalyst degradation can be determined based on the amount of intake air drawn until the air-fuel ratio detected downstream of the catalyst changes from rich to lean under that environment. As a result, catalyst degradation can be accurately determined without the determination being based on the oxygen storage capacity of the catalyst.

According to the fifth and tenth aspects of the invention, by gradually increasing the change period of the target air-fuel ratio, it is possible to create an environment in which the oxygen releasing reaction readily occurs in the catalyst. Thus, catalyst degradation can be determined based on the amount of intake air drawn until the air-fuel ratio detected downstream of the catalyst changes from lean to rich lean under that environment. As a result, catalyst degradation can be accurately determined without the determination being based on the oxygen storage capacity of the catalyst.

BRIEF DESCRIPTION OF THE DRAWINGS

The above-mentioned objects, features, advantages, technical and industrial significance of this invention will be better understood by reading the following detailed description of preferred embodiments of the invention, when considered in connection with the accompanying drawings, in which:

FIG. 10 is a view illustrating a method for determining catalyst degradation according to a fourth example embodiment of the invention;

FIG. 12 is a view illustrating a method for determining catalyst degradation according to a fifth example embodiment of the invention;

FIG. 14 is a view showing the change in temperature that accompanies an oxygen absorbing reaction in the catalyst.

DETAILED DESCRIPTION OF THE PREFERRED EMBODIMENTS

Figure 1:
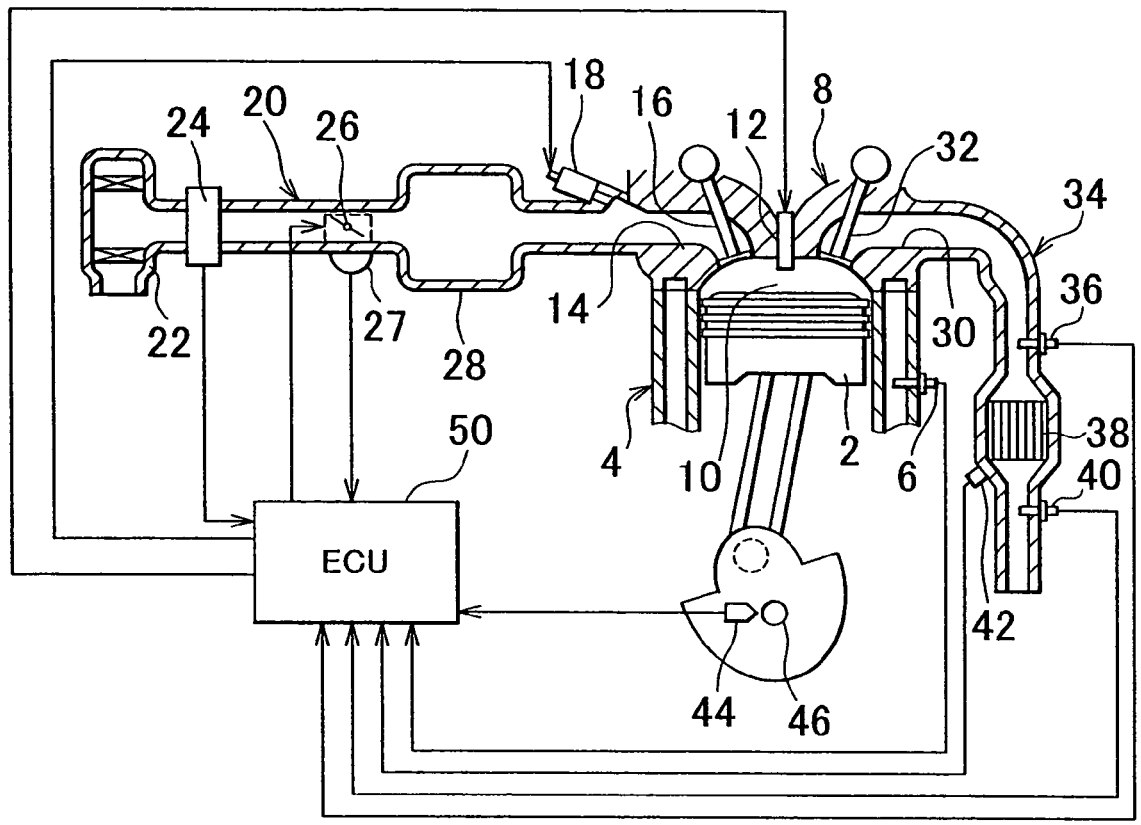
FIG. 1 is a conceptual diagram of the structure of an internal combustion engine system according to a first example embodiment of the invention.

Hereinafter, example embodiments of the invention will be described with reference to the accompanying drawings. Elements which are common throughout the drawings will be denoted by like reference characters and redundant descriptions will be omitted.

First Example Embodiment

[Description of the System Structure]
FIG. 1 is a conceptual diagram of the structure of an internal combustion engine system according to a first example embodiment of the invention. The internal combustion engine system described in the first example embodiment has a plurality of cylinders though only one is shown in FIG. 1. As shown in the drawing, the system of this first example embodiment includes a cylinder block 4 with a piston 2 arranged therein. A coolant temperature sensor 6 which detects the temperature of coolant is also provided in the cylinder block 4.

A cylinder head 8 is assembled to the upper part of the cylinder block 4. A combustion chamber 10 is formed in the space between the top surface of the piston 2 and the cylinder head 8, and a spark plug 12 which ignites an air-fuel mixture in the combustion chamber 10 is provided in the cylinder head 8.

The cylinder head 8 also includes an intake port 14 which opens to the combustion chamber 10. An air intake valve 16 is provided at a portion where the intake port 14 connects with the combustion chamber 10. An intake passage 20 is connected to the intake port 14. A fuel injector 18 which injects fuel near the intake port 14 is provided near the intake port 14. An air cleaner 22 is provided at an upstream end of the intake passage 20, and an airflow meter 24 is provided downstream of the air cleaner 22 in the intake passage 20. This airflow meter 24 is structured to detect an intake air amount Ga. A throttle valve 26 is provided downstream of the airflow meter 24. Provided near this throttle valve 26 is a throttle sensor 27 which is structured to detect a throttle opening amount TA. A surge tank 28 is provided downstream of the throttle valve 26.

The cylinder head 8 also includes an exhaust port 30 that opens to the combustion chamber 10. An exhaust valve 32 is provided at a portion where the exhaust port 30 connects with the combustion chamber 10. Connected to the exhaust port 30 is an exhaust passage 34, in which is provided a catalyst 38. This catalyst 38 is structured to purify exhaust gas that is discharged from the combustion chamber 10. An air-fuel ratio sensor 36 that detects an air-fuel ratio of the exhaust gas is provided upstream of the catalyst 38 in the exhaust passage 34. An oxygen sensor 40 is provided downstream of the catalyst 38. This oxygen sensor 40 is structured to reverse its output signal depending on whether the air-fuel ratio is rich or lean. A catalyst temperature sensor 42 which detects the temperature of the catalyst 38 is provided in the catalyst 38.

The system of the first example embodiment also includes an electronic control unit (ECU) 50 as a control apparatus. The spark plug 12, the fuel injector 18, and the throttle valve 26, and the like are connected to the output side of this ECU 50, while the coolant temperature sensor 6, the airflow meter 24, the throttle sensor 27, the air-fuel ratio sensor 36, the oxygen sensor 40, the catalyst temperature sensor 42, and a crank angle sensor 44 are connected to the input side of the ECU 50. The crank angle sensor 44 is structured to detect a rotation angle of a crankshaft 46. Based on the outputs from these various sensors, the ECU 50 controls the entire internal combustion engine by performing a variety of controls such as fuel injection control and ignition timing control. In addition, the ECU 50 determines whether the internal combustion engine has finished warming up based on the output from the coolant temperature sensor 6, as well as determines whether the catalyst 38 has finished warming up based on the output from the catalyst temperature sensor 42. The ECU 50 also calculates the engine speed NE based on the output from the crank angle sensor 44, and determines whether the internal combustion engine is operating steadily, which can be determined using parameters such as the intake air amount Ga, the engine speed NE, the throttle opening amount TA, and the accelerator opening amount, for example. Moreover, the ECU 50 also controls the target air-fuel ratio and determines degradation of the catalyst 38 based on the output from the oxygen sensor 40 (hereinafter simply referred to as "oxygen sensor output") at that time, as will be described later.

[Characteristics of the First Example Embodiment]

Figure 2:
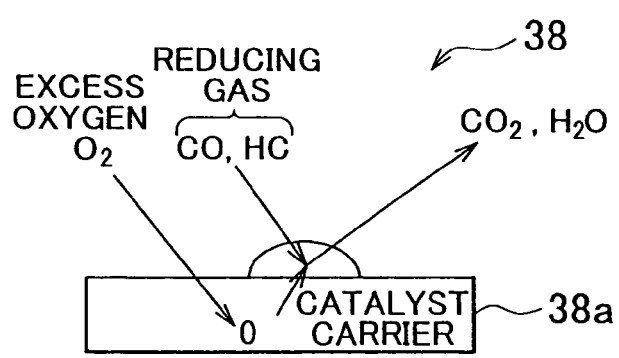
FIG. 2 is a conceptual diagram of an oxygen absorbing reaction and an oxygen releasing reaction in the catalyst.

FIG. 2 is a conceptual diagram of an oxygen absorbing reaction and an oxygen releasing reaction in the catalyst. As shown in the drawing, when lean exhaust gas flows into the catalyst 38, the excess oxygen in the exhaust gas is absorbed by a catalyst carrier (of a precious metal such as Pt, Pd, Rh, or Ce) 38a. On the other hand, if rich exhaust gas, i.e., reducing gas (such as Co and HC) flows into the catalyst 38, it is oxidized by oxygen released from the catalyst carrier 38a and then discharged as CO2 or H2O.

In a catalyst, the reaction rate of an oxygen absorbing reaction is known to be faster than the reaction rate of an oxygen releasing reaction. This tendency becomes even more prominent the greater the degree of catalyst degradation. That is, if the catalyst carrier 38a degrades due to sintering or the like, the reaction rate of the oxygen releasing reaction in the catalyst 38 slows down remarkably. Therefore, in a catalyst that is degraded (hereinafter simply referred to as a "degraded catalyst"), the reaction rate of the oxygen releasing reaction is extremely slow compared to the reaction rate of the oxygen absorbing reaction. Thus, by changing the target air-fuel ratio back and forth between rich and lean in short periods, it is possible to make it appear that only the oxygen absorbing reaction is progressing in the degraded catalyst. When this is done, the degraded catalyst soon becomes saturated with oxygen such that lean exhaust gas blows through the degraded catalyst, resulting in the oxygen sensor producing a lean output.

Figure 3:
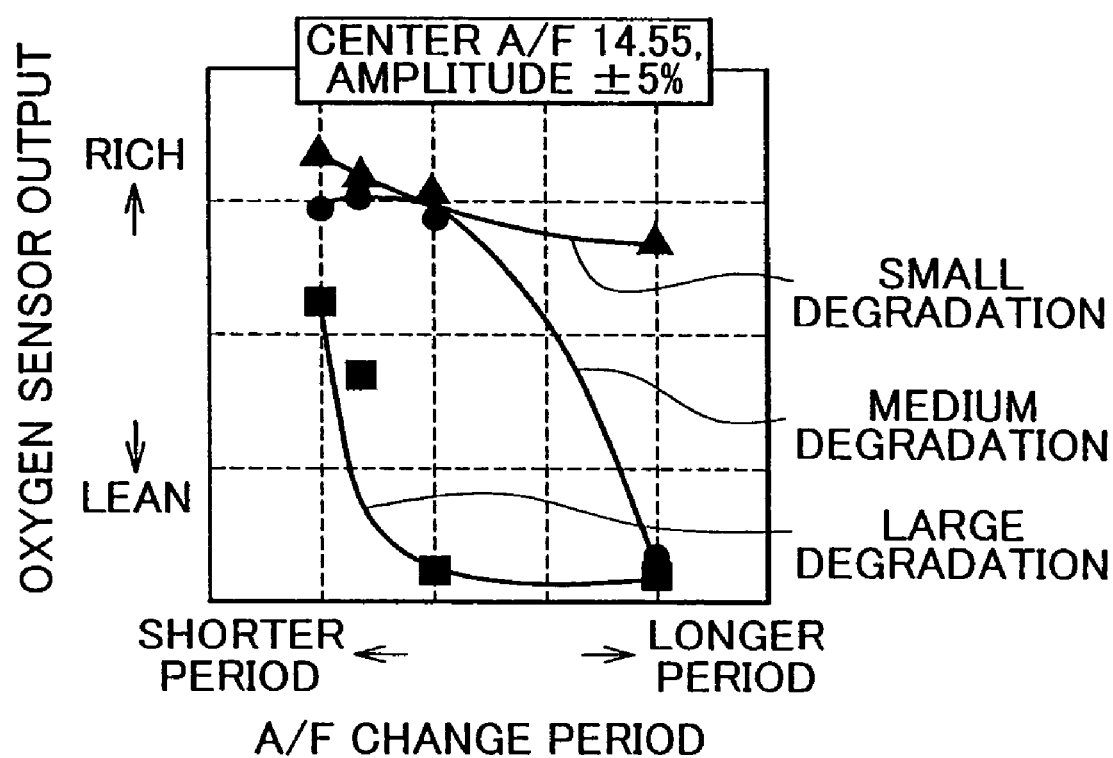
FIG. 3 is a graph showing the relationship between the change period of the target air-fuel ratio and the oxygen sensor output after a predetermined period of time has passed from the time the target air-fuel ratio starts to change.

In catalysts with varying degrees of degradation (i.e., large, medium, and small), the inventor varied the length of the change period of the target air-fuel ratio from short to long and examined the oxygen sensor output for each change period after a predetermined period of time has passed from the time the target air-fuel ratio was changed. The results are shown in FIG. 3, which is a graph showing the relationship between the change period of the target air-fuel ratio and the oxygen sensor output after a predetermined period of time has passed from the time the target air-fuel ratio started to be changed. Here, the target air-fuel ratio is changed around a center value of 14.55 on the slightly rich side, with the change width being ±5% of that change center value. As shown in FIG. 3, when the change period of the target air-fuel ratio is long, the difference between the oxygen sensor output when there is a medium degree of catalyst degradation and the oxygen sensor output when there is a large degree of catalyst degradation is small, which makes it difficult to accurately detect a catalyst with a large degree of degradation. When the change period is short, however, that difference increases, making it possible to accurately detect a catalyst with a large degree of degradation.

Figure 4:
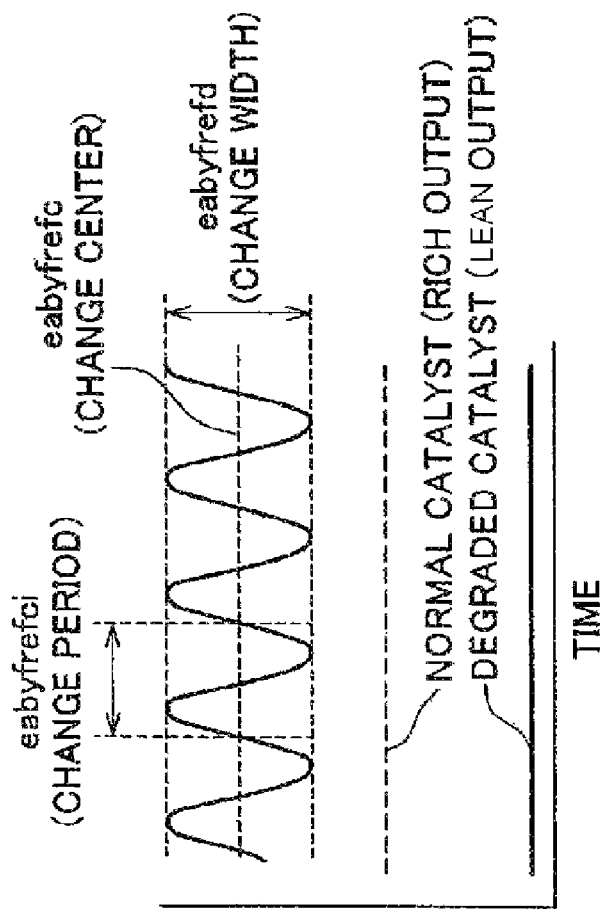
FIG. 4 is a view illustrating a method for determining catalyst degradation according to the first example embodiment of the invention.

FIG. 4 is a view illustrating a method for determining catalyst degradation according to the first example embodiment of the invention. More specifically, FIG. 4A shows the change in the target air-fuel ratio, while FIG. 4B shows the oxygen sensor output after a predetermined period of time has passed from the time the target air-fuel ratio started to be changed. As shown in FIG. 4A, the target air-fuel ratio is changed back and forth between rich and lean. Here, a change period eabyfrefci of the target air-fuel ratio is sufficiently short, such as a value of 0.5 Hz greater, compared with a period which is long enough for a normal catalyst to become saturated with oxygen while the air-fuel ratio of exhaust gas is kept lean within the same period for example. Also, the change center eabyfrefc is, for example, a value of 14.55, and the change width eabyfrefd is a value between 0.1 and 0.5, inclusive, for example. Changing the target air-fuel ratio in short periods this way causes the air-fuel ratio of the exhaust gas that flows into the catalyst to change. As a result, the oxygen absorbing reaction and the oxygen releasing reaction occur alternately in the catalyst. As described above, with a degraded catalyst, the reaction rate of the oxygen releasing reaction is extremely slow compared to the reaction rate of the oxygen sensor, so it appears that only the oxygen absorbing reaction is progressing. Therefore, a degraded catalyst becomes saturated with oxygen sooner than a normal catalyst does. As a result, the air-fuel ratio of the exhaust gas flowing through the catalyst becomes lean sooner in a degraded catalyst than it does in a normal catalyst. Accordingly, with a degraded catalyst the oxygen sensor produces a lean output after a predetermined period of time has passed from the time the target air-fuel ratio starts to change, while with a normal catalyst the oxygen sensor produces a rich output after a predetermined period of time has passed from the time the target air-fuel ratio started to be changed, as shown in FIG. B.

Thus, according to the first example embodiment, the target air-fuel ratio is changed back and forth between rich and lean in short periods. Catalyst degradation can then be determined based on the oxygen sensor output after a predetermined period of time has passed from the time that change started. As a result, catalyst degradation can be accurately determined without the need to calculate the oxygen storage capacity of the catalyst.

[Specific Steps in the First Example Embodiment]

Figure 5:
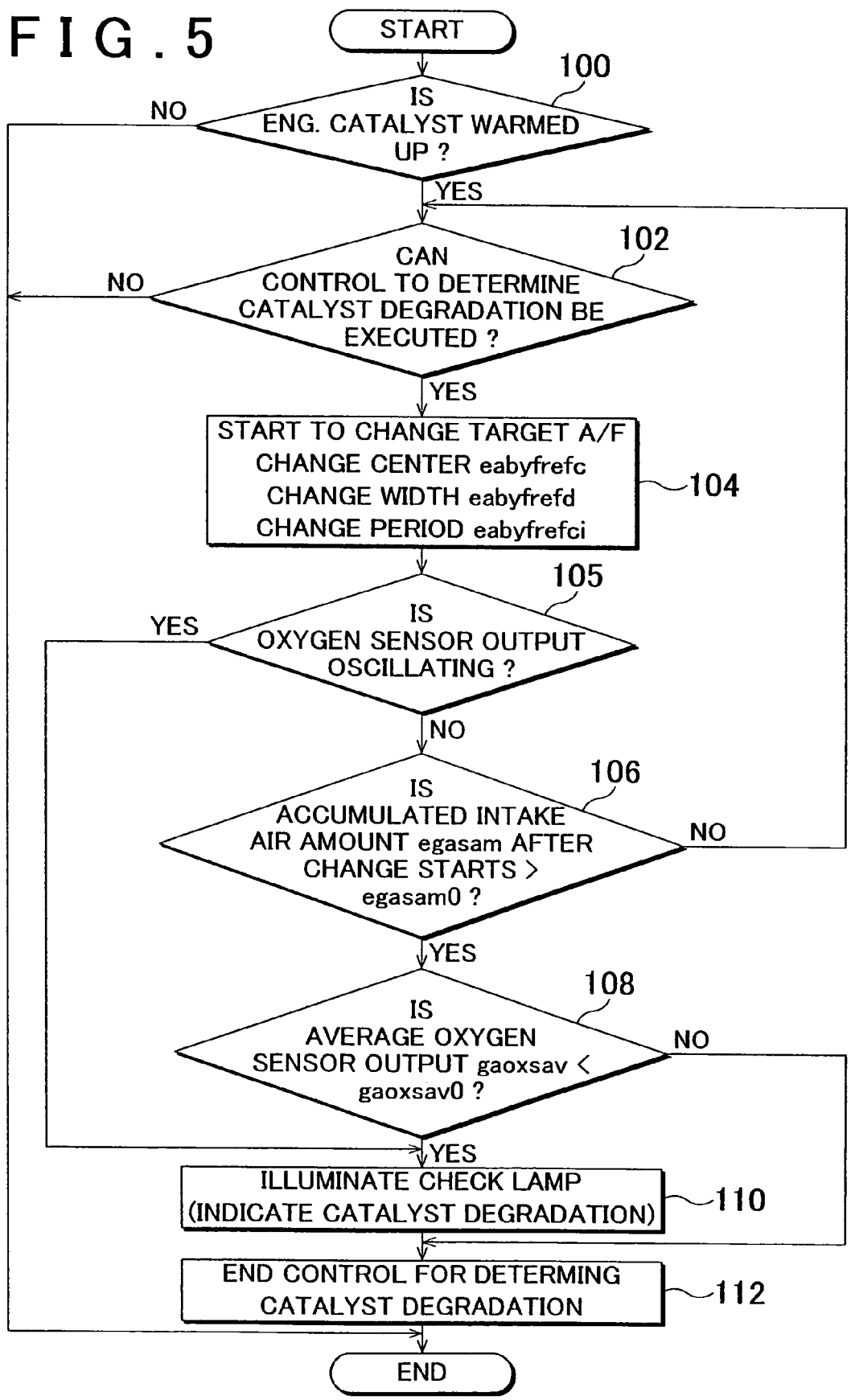
FIG. 5 is a flowchart illustrating control for determining catalyst degradation which is executed by an ECU in the first example embodiment of the invention.

FIG. 5 is a flowchart illustrating control for determining catalyst degradation which is executed by the ECU 50 in the first example embodiment of the invention. In the flowchart shown in the drawing, it is first determined whether the internal combustion engine and the catalyst 38 have finished warming up (step S100). If it is determined in step S100 that warm-up is complete, then it is next determined whether control for determining catalyst degradation can be executed, or more specifically, whether the internal combustion engine is operating steadily such that the target air-fuel ratio can be accurately controlled (step S102). Steady operation can be determined based on the intake air amount Ga and the accelerator opening amount and the like. If it is determined in step S100 that the internal combustion engine and the catalyst 38 have not yet finished warming up, or determined in step S102 that control for determining catalyst degradation can not be executed, then the control ends. In this case, it is determined that control for determining degradation of the catalyst 38 can not be accurately performed.

If, however, it is determined in step S102 that the control for determining catalyst degradation can be executed, then the target air-fuel ratio starts to be changed (step S104). In step S104, in order to change the target air-fuel ratio back and forth between rich and lean in short periods, the ECU 50 reads the values of the change center eabyfrefc, the change width eabyfrefd, and the change period eabyfrefci which are set beforehand. Here, the change center eabyfrefc is preferably set to a value that is slightly richer than the stoichiometric air-fuel ratio (such as 14.55). The reaction rate of the oxygen releasing reaction is slightly faster than that of the oxygen absorbing reaction so the oxygen sensor may produce a lean output even in a normal catalyst. In this routine, when the oxygen sensor produces a lean output, the ECU 50 determines (in step S108 to be described later) that the catalyst is degraded. Therefore, making the change center eabyfrefc a value that is slightly on the rich side enables the oxygen sensor to produce a rich output in a normal catalyst, thereby making it possible to accurately determine degradation of the catalyst. The change width eabyfrefd is preferably a value between 0.1 and 0.5, inclusive, for example. Also, the change period eabyfrefci is a period that is sufficiently shorter than the period which is long enough for a normal catalyst to become saturated with oxygen while the air-fuel ratio of exhaust gas is kept lean within the same period, preferably a value of 0.5 Hz or greater, for example. Changing the target air-fuel ratio in short periods in this way causes lean and rich exhaust gas to alternately flow in short periods into the catalyst. As a result, the oxygen absorbing reaction and the oxygen releasing reaction occur alternately in short periods in the catalyst. With a degraded catalyst, however, the reaction rate of the oxygen releasing reaction is extremely slow so it appears that only the oxygen absorbing reaction is progressing. That is, in a degraded catalyst, oxygen continues to be absorbed after the target air-fuel ratio starts to change.

Next it is determined whether the oxygen sensor output is changing in synchronization with the change in the target air-fuel ratio (step S105). In step S105, it is determined whether the oxygen storage capacity of the catalyst 38 is near zero, i.e., whether abnormal degradation is occurring in the catalyst 38. If it is determined that the oxygen sensor output is changing, i.e., if it is determined that the catalyst 38 is degrading abnormally, then a check lamp provided in the vehicle is illuminated (step S110) and the control for determining catalyst degradation ends (step S112).

If, on the other hand, it is determined in step S105 that the oxygen sensor output is not changing, i.e., if it is determined that the catalyst 38 is not degrading abnormally, then it is determined whether an amount of air drawn into the internal combustion engine after the target air-fuel ratio started change (hereinafter referred to as "accumulated intake air amount") egasam is greater than a set value egasam0. Here, through a different routine than the routine currently being described, the ECU 50 adds up the total amount of air drawn into the internal combustion engine after the target air-fuel ratio started to be changed. The ECU 50 then reads this accumulated air amount as the accumulated intake air amount egasam. Also, the set value egasam0 is a value that is set for each vehicle taking into account catalyst size and the like. In step S106, it is determined whether the effect from the change in the target air-fuel ratio was reflected in the catalyst 38 and the oxygen sensor output. More specifically, it is determined whether enough exhaust gas for the degraded catalyst to become saturated with oxygen has been discharged from the internal combustion engine if oxygen has continued to be absorbed in the degraded catalyst after the target air-fuel ratio started to be changed. If it is determined in step S106 that the accumulated intake air amount egasam is equal to or less than the set value egasam0, i.e., if it is determined that the effect from the change in the target air-fuel ratio is not reflected in the catalyst 38 and the oxygen sensor output, then step S102 is executed again. If, on the other hand, it is determined in step S106 that the accumulated intake air amount egasam is greater than the set value egasam0, i.e., if it is determined that the effect from the change in the target air-fuel ratio is reflected in the catalyst 38 and the oxygen sensor output, then it is next determined whether an average oxygen sensor output gaoxsav in a fixed period of time is less than a degradation determining reference value gaoxsav0 (step S108). That is, in step S108, it is determined whether the air-fuel ratio of the exhaust gas flowing through the catalyst 38 is lean. Also, the degradation determining reference value gaoxsav0 is a value that is set for each vehicle.

If it is determined in step S108 that the average oxygen sensor output gaoxsav is less than the degradation determining reference value gaoxsav0, i.e., if it is determined that the air-fuel ratio of the exhaust gas flowing through the catalyst 38 is lean, then it is determined that the catalyst is saturated with oxygen. That is, because the catalyst is degraded, only the oxygen absorbing reaction appears to be progressing in the catalyst and it is determined that the catalyst has reached the oxygen saturation point. In this case, the target air-fuel ratio stops being changed and the check lamp provided in the vehicle is illuminated to notify the driver of the vehicle that the catalyst is degraded (step S110), after which the control for determining catalyst degradation ends (step S112).

If, on the other hand, it is determined in step S108 that the average oxygen sensor output gaoxsav is equal to or greater than the degradation determining reference value gaoxsav0, i.e., if it is determined that the air-fuel ratio of the exhaust gas flowing through the catalyst 38 is not lean, then it is determined that the catalyst is not yet saturated with oxygen. That is, because the catalyst is not degraded, the oxygen absorbing reaction alone does not appear to be progressing in the catalyst so it is determined that the catalyst is not yet saturated with oxygen. In this case, the control to change the target air-fuel ratio is cancelled and the control for determining catalyst degradation ends without the check lamp being illuminated (step S112).

As described above, the routine illustrated in FIG. 5 changes the target air-fuel ratio in short periods, detects the time at which the accumulated intake air amount egasam after that change started has reached the predetermined amount egasam0, and is able to determine that the catalyst is degraded if the oxygen sensor output gaoxsav at that time is lean. Accordingly, degradation of the catalyst can be accurately determined without that determination being based on the oxygen storage capacity of the catalyst. That is, catalyst degradation can be detected without calculating the oxygen storage capacity. Furthermore, this routine enables the oxygen sensor to produce a rich output with a normal catalyst by setting the change center of the target air-fuel ratio on the rich side of the stoichiometric air-fuel ratio. Accordingly, when the oxygen sensor produces a lean output, it can accurately be determined that the catalyst is degraded. As a result, erroneous determinations can be avoided so degradation of the catalyst can be accurately determined.

In the first example embodiment, warm-up must be complete (step S100) and operation must be steady (step S102) in order for the target air-fuel ratio to start being changed. In addition to these conditions, the intake air amount may also be required to be equal to or less than a predetermined value in order for the target air-fuel ratio to start being changed. If the intake air amount is low (such as equal to or less than 10 g/sec), the amount of exhaust gas flowing into the catalyst 38 is small which means the amount of reducing gas flowing into the catalyst 38 is also small. Therefore, degradation of the catalyst can be determined more accurately because control for determining catalyst degradation can be executed under the condition that the oxygen releasing reaction in the catalyst be even smaller. (This is also true for the other following example embodiments).

Also in the first example embodiment, the air-fuel ratio downstream of the catalyst is detected by the oxygen sensor 40. Alternatively, however, it is also possible to use a system that detects the air-fuel ratio downstream of the catalyst with an air-fuel ratio sensor. In this case as well, similar effects to those obtained in the first example embodiment can be obtained. (This is also true for the other following example embodiments).

Furthermore, in the first example embodiment, a value between 0.1 and 0.5, inclusive, is given as a specific numerical value of the change width eabyfrefd of the target air-fuel ratio. The invention is not limited to this numerical value, however. That is, this value may be changed without departing from the spirit of the invention, and can be set appropriately for each vehicle according to catalyst size and the like.

Also, in the first example embodiment, a value of 0.5 Hz or greater is given as a specific numerical value for the change period eabyfrefci of the target air-fuel ratio. The invention is not limited to this numerical value, however. That is, this value may be changed without departing from the spirit of the invention. Any numerical value may be used for the change period as long as the difference between the reaction rates of the oxygen absorbing reaction and the oxygen releasing reaction in the degraded catalyst (i.e., a largely degraded catalyst) is equal to or greater than a predetermined value, i.e., as long as the value can make it appear that only the oxygen absorbing reaction is progressing in the degraded catalyst. This state, in which it appears that only the oxygen absorbing reaction is progressing in the degraded catalyst, makes it possible to accurately identify a catalyst in which there is a medium degree of degradation, as well as a catalyst in which there is a large degree of degradation. This kind of state is able to be created by making the change period a period that is at least shorter than the period which is long enough for a normal catalyst to become saturated with oxygen while the air-fuel ratio of exhaust gas is kept lean within the same period.

Second Example Embodiment

Next, a second example embodiment of the invention will be described with reference to FIGS. 6 and 7. The system of this second example embodiment can be realized by using the hardware structure shown in FIG. 1 and having the ECU 50 execute the routine illustrated in FIG. 7 which will be described later.

Figures 6A, 6B:
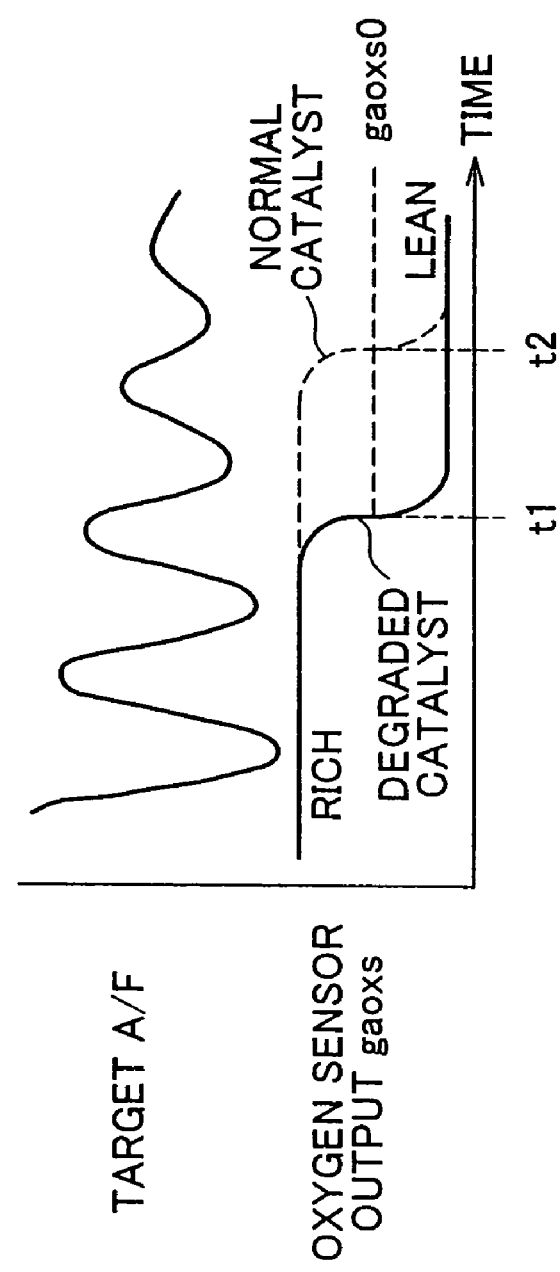
FIG. 6 is a view illustrating a method for determining catalyst degradation according to a second example embodiment of the invention.

FIG. 6 is a view illustrating a method for determining catalyst degradation according to the second example embodiment of the invention. More specifically, FIG. 6A shows the change in the target air-fuel ratio, while FIG. 6B shows the change in the oxygen sensor output following the change in the target air-fuel ratio. First, the target air-fuel ratio is changed in periods that are sufficiently shorter than a period which is long enough for a normal catalyst to become saturated with oxygen while the air-fuel ratio of exhaust gas is kept lean within the same period, just as in the first example embodiment. In this second example embodiment, the change width of the target air-fuel ratio is gradually reduced a fixed period of time after the change starts, as shown in FIG. 6A. Here, the concentration of reducing gas flowing into the catalyst 38 decreases as the change width of the target air-fuel ratio becomes smaller, which creates an environment in which oxygen does not readily release from the catalyst 38. By producing this kind of environment, not only a degraded catalyst but also a normal catalyst will soon become saturated with oxygen such that the air-fuel ratio of the exhaust gas flowing through the catalyst will become lean. As described above, however, the decline in the reaction rate of the oxygen releasing reaction is greater in a degraded catalyst than it is in a normal catalyst, i.e., the difference between the reaction rates of the oxygen absorbing reaction and the oxygen releasing reaction is greater in a degraded catalyst. Therefore, a degraded catalyst will become saturated with oxygen before a normal catalyst will. As a result, as shown in FIG. 6B, the time at which the oxygen sensor output reverses from a rich output to a lean output is earlier in a degraded catalyst (i.e., t1) than it is in a normal catalyst (i.e., t2). Also, the time at which the oxygen sensor output reverses is earlier in a catalyst with a large degree of degradation than it is in a catalyst with a small degree of degradation.

Accordingly, the second example embodiment makes it possible to accurately determine catalyst degradation by gradually reducing the change width of the target air-fuel ratio and detecting the time at which the oxygen sensor output reverses from a rich output to a lean output. Moreover, the degree of catalyst degradation can be accurately detected based on the point at which the oxygen sensor output reverses.

[Specific Steps in the Second Example Embodiment]

Figure 7A:
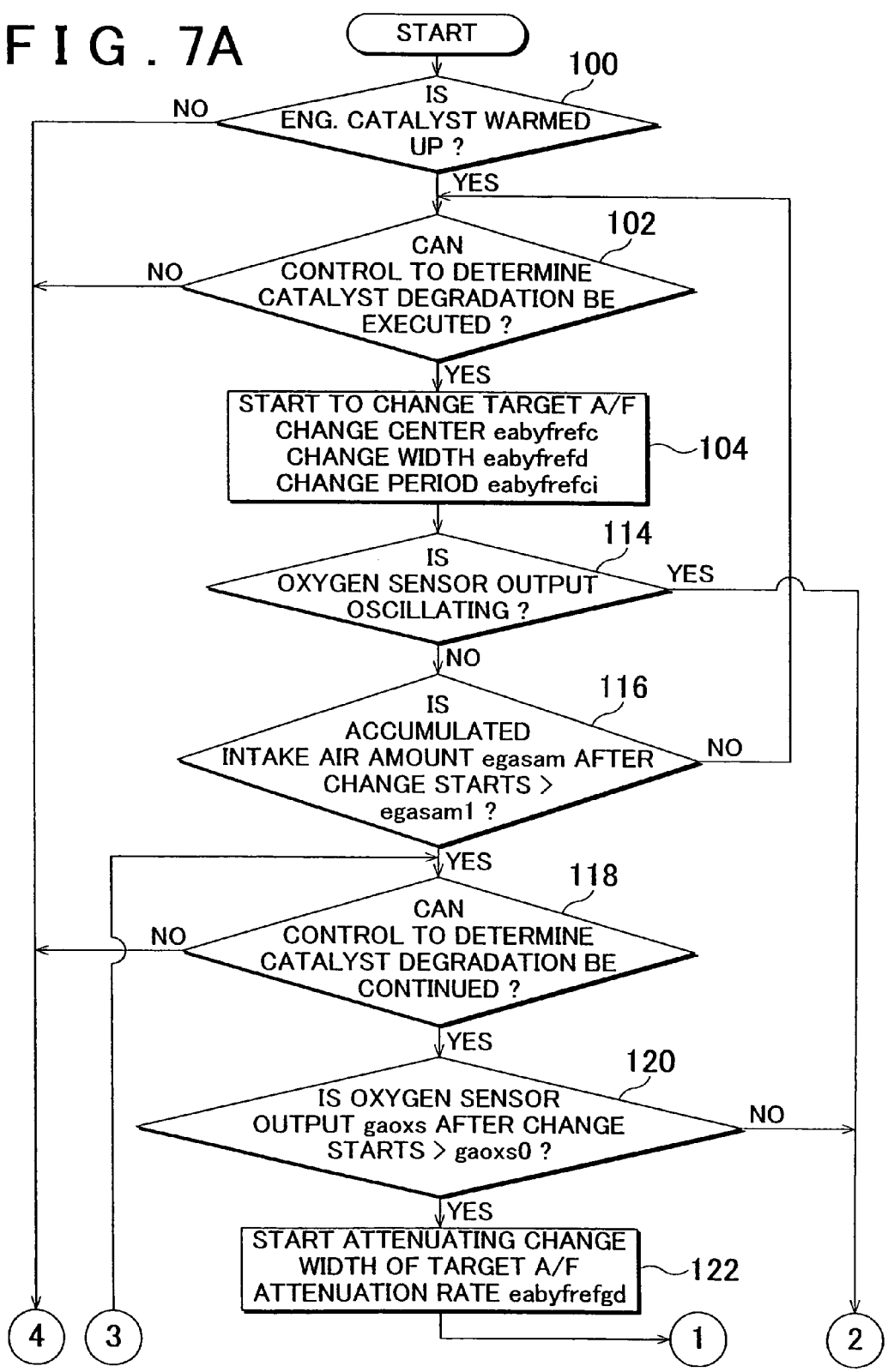
FIG. 7 is a flowchart illustrating control for determining catalyst degradation which is executed by an ECU in the second example embodiment of the invention.
Figure 7B:
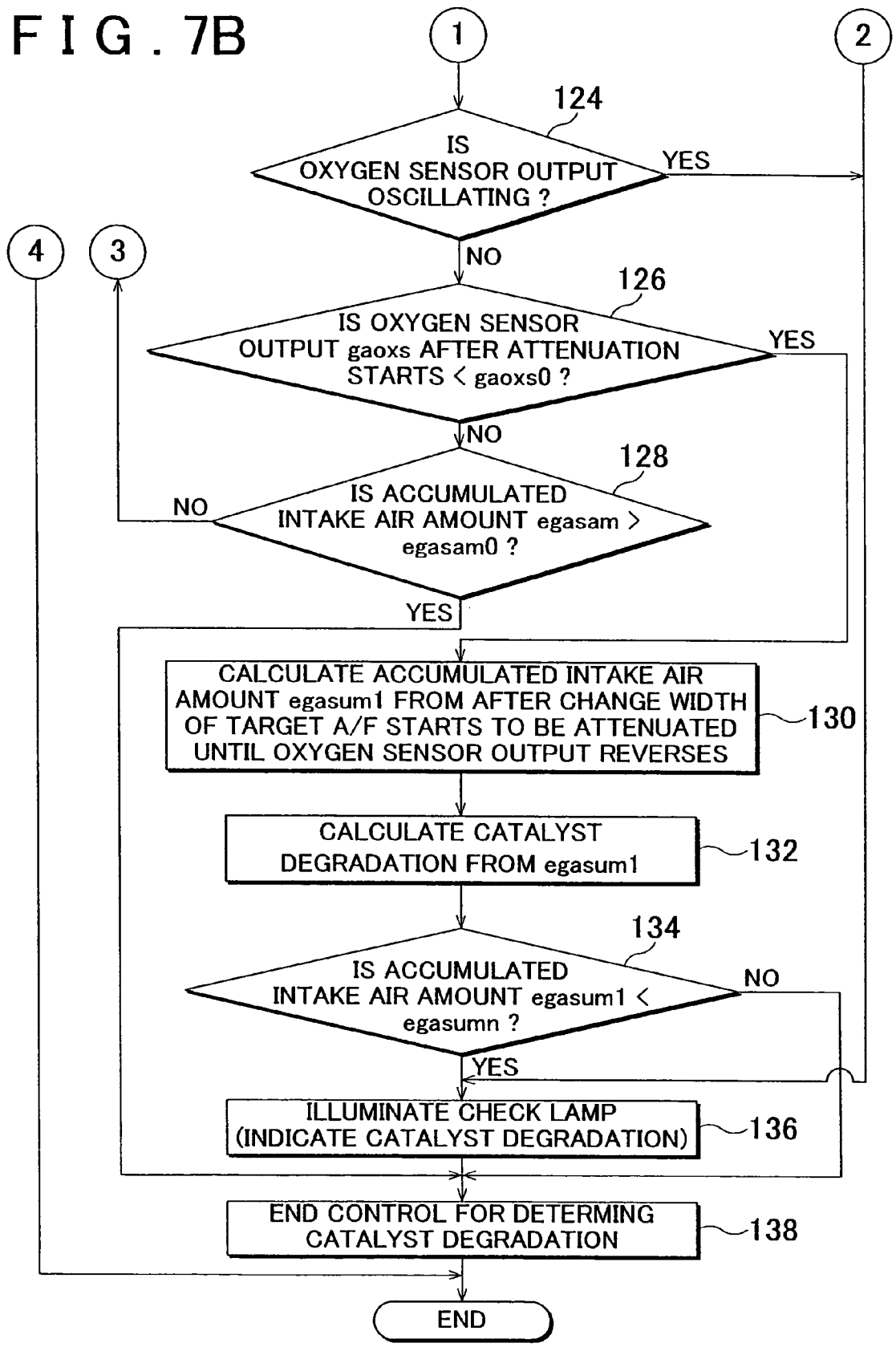

FIG. 7 is a flowchart illustrating control for determining catalyst degradation which is executed by the ECU 50 according to the second example embodiment of the invention. In the flowchart shown in the drawing, if it is first determined in step S100 that warm-up is complete and then determined in step S102 that the control for determining catalyst degradation can be executed, then the target air-fuel ratio starts to be changed (step S104), just like in the first example embodiment.

Next it is determined whether the oxygen sensor output is changing in synchronization with the change in the target air-fuel ratio (step S114), just as in step S105 in the flowchart shown in FIG. 5. If it is determined in step S114 that the oxygen sensor output is changing, i.e., if it is determined that the catalyst 38 is degrading abnormally, then the check lamp provided in the vehicle is illuminated (step S136) and the control for determining catalyst degradation ends (step S138). If, on the other hand, it is determined in step S114 that the oxygen sensor output is not changing, i.e., if it is determined that the catalyst 38 is not degrading abnormally, then it is determined whether the accumulated intake air amount egasam after the target air-fuel ratio started to be changed is greater than a set value egasam1 (step S116). Just as in the first example embodiment, the ECU 50 reads the air amount accumulated in a different routine as the accumulated intake air amount egasam. In step S116, it is determined whether a constant amount of exhaust gas is flowing into the catalyst in order to stabilize the catalyst. Thus, the set value egasam1 is a value that is smaller than the set value egasam0 used in step S106 in the flowchart shown in FIG. 5. Also, the set value egasam1 is a value set for each vehicle, taking into account catalyst size and the like if it is determined in step S116 that the accumulated intake air amount egasam is equal to or less than the set value egasam1, i.e., if it is determined that a constant amount of exhaust gas is not flowing into the catalyst 38, then step S102 is executed again.

If it is determined in step S116 that the accumulated intake air amount egasam is greater than the set value egasam1, i.e., if it is determined that a constant amount of exhaust gas is flowing into the catalyst 38, then it is determined whether control for determining catalyst degradation can continue based on the intake air amount Ga, the accelerator opening amount, and the like, just as in step S102 (step S118). If it is determined in step S118 that the control for determining catalyst degradation can not continue, the control ends.

If it is determined in step S118 that the control for determining catalyst degradation can continue, however, then it is next determined whether the oxygen sensor output gaoxs is greater than a reference value gaoxs0 (step S120). In step S120, it is determined whether the air-fuel ratio of the exhaust gas flowing through the catalyst 38 is rich. If it is determined in step S120 that the oxygen sensor output gaoxs is equal to or less than the reference value gaoxs0, i.e., if it is determined that the air-fuel ratio of the exhaust gas flowing though the catalyst 38 is lean, then it is determined that the catalyst is becoming saturated with oxygen early. In this case as well, the check lamp provided in the vehicle is illuminated because it is determined that the degree of degradation of the catalyst is large (step S136).

If it is determined in step S120 that the oxygen sensor output gaoxs is greater than the reference value gaoxs0, i.e., if it is determined that the air-fuel ratio of the exhaust gas flowing through the catalyst 38 is rich, then the change width eabyfrefd of the target air-fuel ratio starts to be attenuated (step S122). In step S122, the ECU 50 reads the value of an attenuation rate eabyfrefgd of the change width set in advance. Attenuating the change width of the target air-fuel ratio lowers the concentration of reducing gas flowing into the catalyst 38, thereby creating an environment in which the oxygen releasing reaction does not readily occur in the catalyst 38.

Next it is determined whether the oxygen sensor output is changing in synchronization with the change in the target air-fuel ratio (step S124), just like in step S114. If it is determined in step S124 that the oxygen sensor output is changing, i.e., if it is determined that the catalyst is degrading abnormally, then the check lamp provided in the vehicle is illuminated (step S136).

If, on the other hand, it is determined in step S124 that the oxygen sensor output is not changing, i.e., if it is determined that the catalyst is not degrading abnormally, then it is next determined whether the oxygen sensor output gaoxs is less than the reference value gaoxs0 (step S126). In step S126 it is determined whether the air-fuel ratio of the exhaust gas flowing through the catalyst 38 is lean. If it is determined in step S126 that the oxygen sensor output gaoxs is equal to or greater than the reference value gaoxs0, i.e., if it is determined that the air-fuel ratio of the exhaust gas flowing through the catalyst 38 is not lean but rich, then it is determined whether the accumulated intake air amount egasam after the target air-fuel ratio started to be changed is greater than the set value egasam0 (step S128). The ECU 50 reads the intake air accumulated in a different routine as the accumulated intake air amount egasam. In step S128, it is determined whether the change width of the target air-fuel ratio is small enough to be able to determine that the catalyst is normal. Also, the set value egasam0 is a value set for each vehicle, taking into account catalyst size and the like.

If it is determined in step S128 that the accumulated intake air amount egasam is equal to or less than the set value egasam0, i.e., if it is determined that the change width of the target air-fuel ratio is not sufficiently small, step S118 is executed again. If, on the other hand, it is determined in step S128 that the accumulated intake air amount egasam is greater than the set value egasam0, then it is determined that the change width of the target air-fuel ratio is sufficiently small. That is, it is determined that the degree of catalyst degradation is small because the air-fuel ratio of the exhaust gas flowing through the catalyst 38 is rich despite the fact that the change width of the target air-fuel ratio is sufficiently small. In this case, the control for determining catalyst degradation ends (step S138) without waiting for the oxygen sensor output gaoxs to become smaller than the set value gaoxs0, i.e., without waiting for the air-fuel ratio of the exhaust gas flowing through the catalyst 38 to change from rich to lean.

If it is determined in step S126 that the oxygen sensor output gaoxs is less than the reference value gaoxs0, i.e., if it is determined that the air-fuel ratio of the exhaust gas flowing through the catalyst 38 is lean, then an accumulated intake air amount egasam1 from after the change width of the target air-fuel ratio starts to be attenuated until it is determined that the oxygen sensor output gaoxs is less than the reference value gaoxs0 is calculated (step S130). Here, the ECU 50 can read the air amount accumulated in a different routine as the accumulated intake air amount egasam1. Next, the degree of catalyst degradation corresponding to that calculated accumulated intake air amount egasam1 is calculated by referencing a map stored beforehand in the ECU 50 (step S132). In this map, the degree of catalyst degradation is set to increase the smaller the accumulated intake air amount egasum1. Accordingly, the degree of catalyst degradation can be accurately obtained based on the accumulated intake air amount egasum1.

Moreover, it is determined whether the accumulated intake air amount egasum1 is less than a catalyst degradation determining reference value egasumn (step S134). The catalyst degradation determining reference value egasumn is a value set for each vehicle, taking into account catalyst size and the like. If it is determined in step S134 that the accumulated intake air amount egasum1 is less than the catalyst degradation determining reference value egasumn, then it is determined that the degree of catalyst degradation is large. In this case, the check lamp provided in the vehicle is illuminated (step S136) and then the control for determining catalyst degradation ends (step S138). If, on the other hand, it is determined in step S134 that the accumulated intake air amount egasum1 is equal to or greater than the catalyst degradation determining reference value egasumn, then it is determined that the degree of catalyst degradation is within the allowable limit. In this case, the control for determining catalyst degradation is cancelled without illuminating the check lamp (step S138).

as described above, in the routine illustrated in FIG. 7, the change width eabyfrefd of the target air-fuel ratio is gradually attenuated and the accumulated intake air amount egasum1 from the start of that attenuation until the oxygen sensor output gaoxs reverses is calculated. Degradation of the catalyst can then be determined based on that calculated accumulated intake air amount egasum1. Thus, degradation of the catalyst can be accurately determined without that determination being based on the oxygen storage capacity of the catalyst. Furthermore, a catalyst with a large degree of degradation can also be accurately detected.

Third Example Embodiment

Next, a third example embodiment of the invention will be described with reference to FIGS. 8 and 9. The system of this third example embodiment can be realized by using the hardware structure shown in FIG. 1 and having the ECU 50 execute the routine illustrated in FIG. 8 which will be described later.

[Characteristics of the Third Example Embodiment]

Figures 8A, 8B:
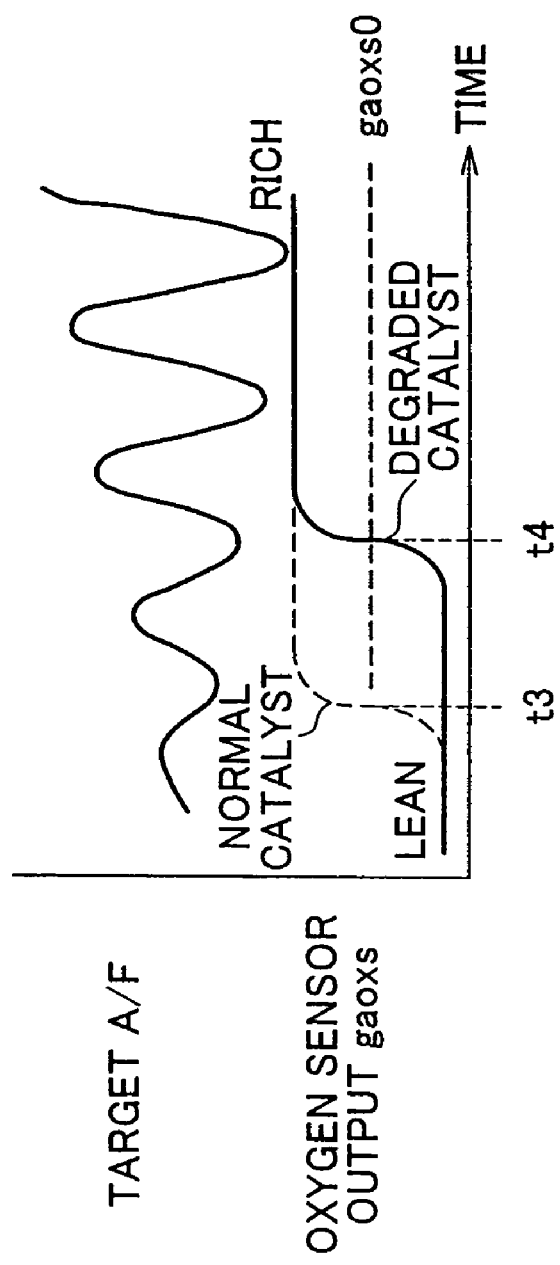
FIG. 8 is a view illustrating a method for determining catalyst degradation according to a third example embodiment of the invention.

FIG. 8 is a view illustrating a method for determining catalyst degradation according to the third example embodiment of the invention. More specifically, FIG. 8A shows the change in the target air-fuel ratio, while FIG. 8B shows the change in the oxygen sensor output following the change in the target air-fuel ratio. In the second example embodiment described above, an environment in which oxygen does not readily release from the catalyst is gradually created by gradually reducing the change width of the target air-fuel ratio, and the point at which the oxygen sensor output reverses from a rich output to a lean output is detected.

In this third example embodiment, the target air-fuel ratio is first changed in periods that are sufficiently shorter than a period which is long enough for a normal catalyst to become saturated with oxygen while the air-fuel ratio of exhaust gas is kept lean within the same period, and with a change width smaller than the change width of the target air-fuel ratio in the first example embodiment. As described above, an environment in which oxygen does not readily release from the catalyst is created because the concentration of reducing gas flowing into the catalyst decreases the smaller the change width of the target air-fuel ratio. Therefore, not only a degraded catalyst but also a normal catalyst will soon become saturated with oxygen such that the oxygen sensor will start to produce a lean output. After the oxygen sensor output changes from a rich output to a lean output in this way, i.e., after a fixed period of time has passed after the target air-fuel ratio started to be changed, the change width of the target air-fuel ratio is gradually increased, as shown in FIG. 8A. Gradually increasing the change width in this way gradually creates an environment in which oxygen readily releases from the catalyst. As a result, the reaction rate of the oxygen releasing reaction in the catalyst gradually increases. The reaction rate of the oxygen releasing reaction is slower in a degraded catalyst than it is in a normal catalyst, i.e., the difference between the reaction rates of the oxygen absorbing reaction and the oxygen releasing reaction is less in a normal catalyst than it is in a degraded catalyst. Therefore, a normal catalyst releases oxygen faster and thus recovers sooner from oxygen saturation than does a degraded catalyst. As a result, as shown in FIG. 8B, the time at which the oxygen sensor output reverses from a lean output to a rich output is earlier in a normal catalyst (i.e., t3) than it is in a degraded catalyst (i.e., t4). Also, the time at which the oxygen sensor output reverses is earlier in a catalyst with a small degree of degradation than it is in catalyst with a large degree of degradation.

Accordingly, the third example embodiment makes it possible to accurately determine catalyst degradation by gradually increasing the change width of the target air-fuel ratio and detecting the time at which the oxygen sensor output reverses from a lean output to a rich output. Moreover, the degree of catalyst degradation can be accurately detected based on the point at which the oxygen sensor output reverses.

[Specific Steps in the Third Example Embodiment]

Figure 9A:
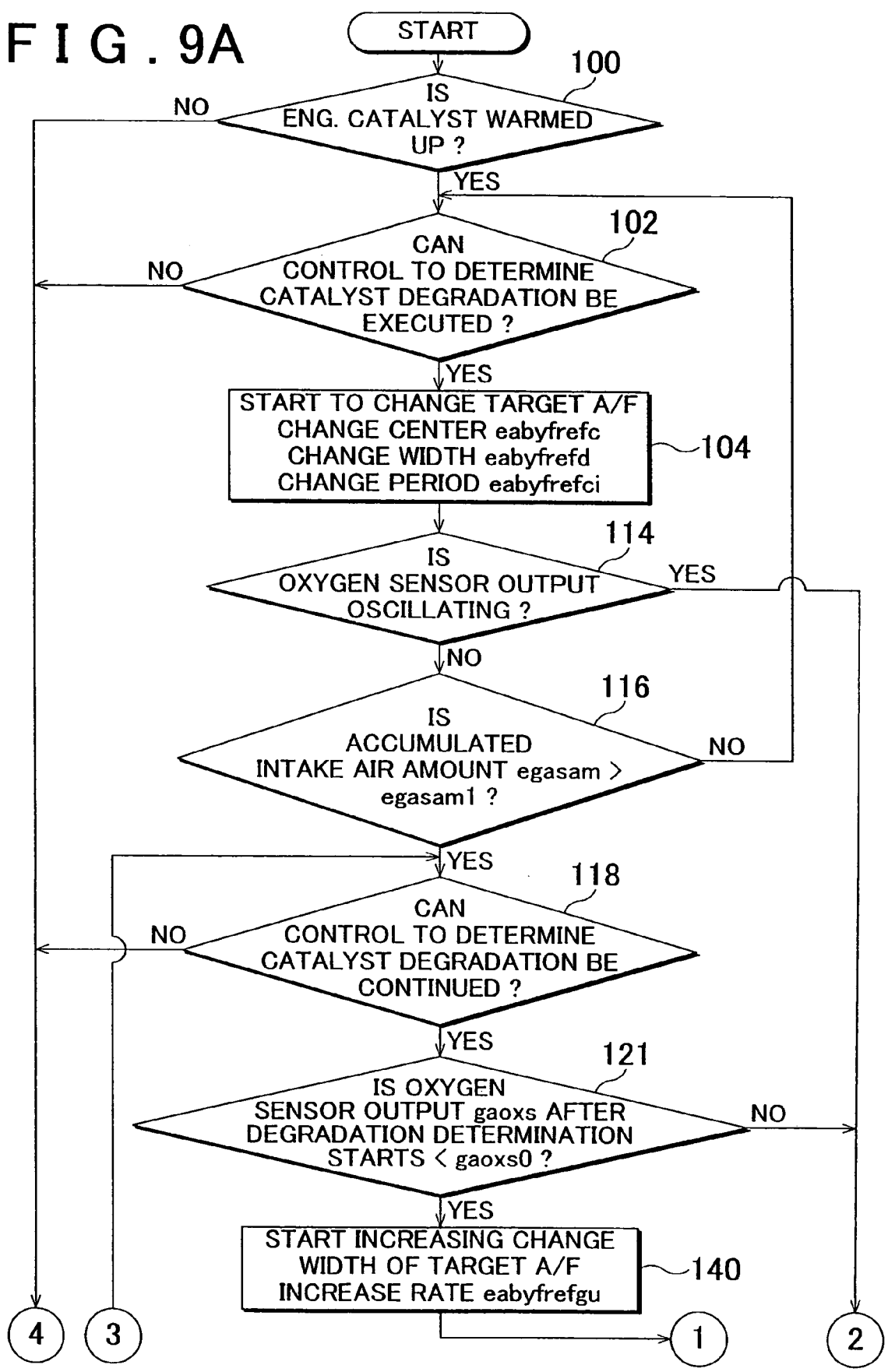
FIG. 9 is a flowchart illustrating control for determining catalyst degradation which is executed by an ECU in the third example embodiment of the invention.
Figure 9B:
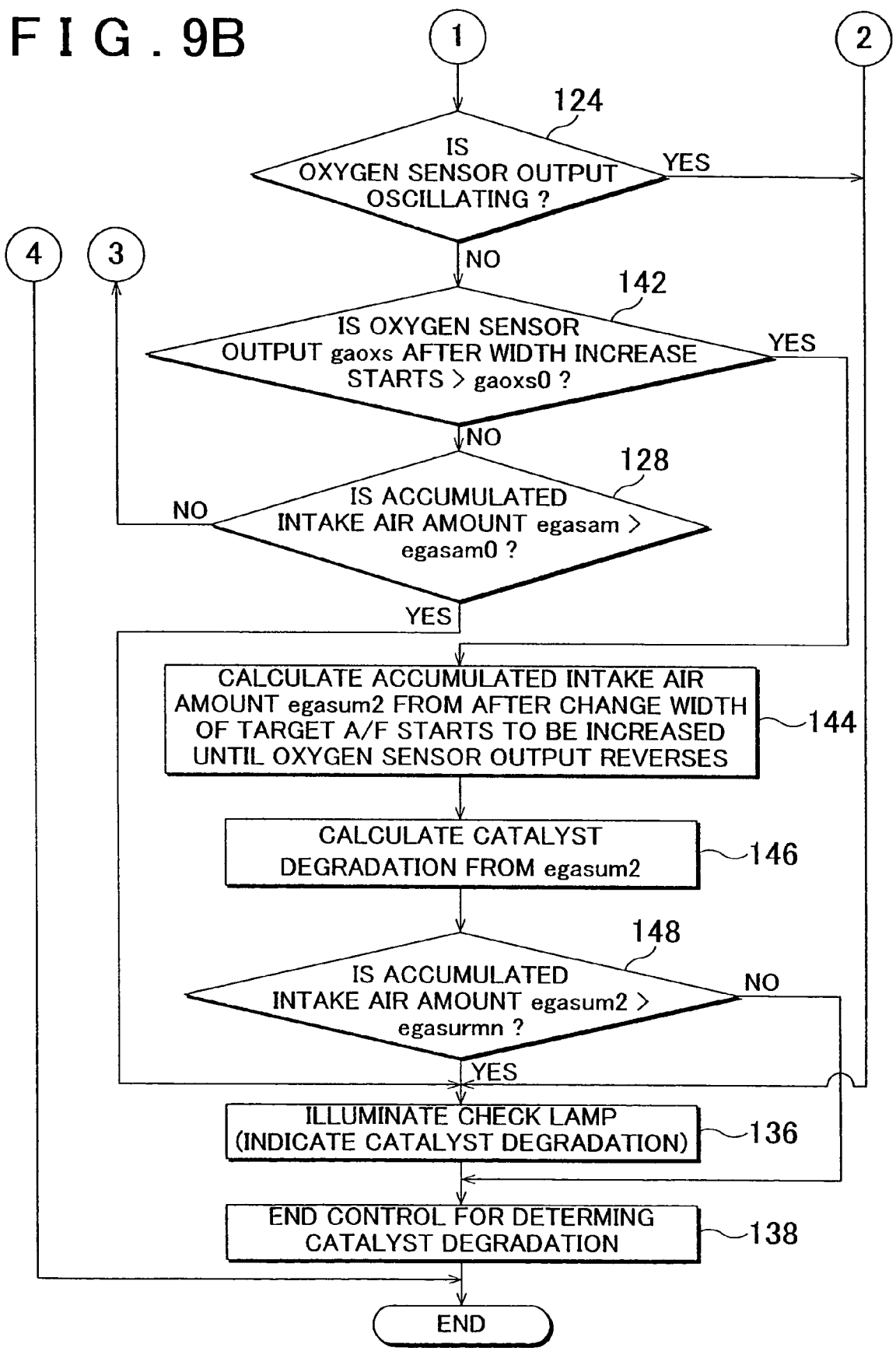

FIG. 9 is a flowchart illustrating control for determining catalyst degradation which is executed by the ECU 50 according to the third example embodiment of the invention. In the flowchart shown in the drawing, if it is first determined in step S100 that warm-up is complete and then determined in step S102 that the control for determining catalyst degradation can be executed, then the target air-fuel ratio starts to be changed (step S104), just like in the first example embodiment. Here, the change width eabyfrefd read by the ECU 50 is a value indicative of a change width that is smaller than the change width read in step S104 in the flowchart illustrated in FIG. 5. As a result, the target air-fuel ratio is controlled in periods that are sufficiently shorter than a period which is long enough for a normal catalyst to become saturated with oxygen while the air-fuel ratio of exhaust gas is kept lean within the same period and at a change width that is smaller than the change width in the first example embodiment.

Next it is determined whether the oxygen sensor output is changing in synchronization with the change in the target air-fuel ratio (step S114), just as in the second example embodiment. If it is determined in step S114 that the oxygen sensor output is changing, i.e., if it is determined that the catalyst 38 is degrading abnormally, then the check lamp provided in the vehicle is illuminated (step S136) and the control for determining catalyst degradation ends (step S138).

If, on the other hand, it is determined in step S114 that the oxygen sensor output is not changing, i.e., if it is determined that the catalyst 38 is not degrading abnormally, then it is determined whether the accumulated intake air amount egasam after the target air-fuel ratio started to be changed is greater than the set value egasam1 (step S116). The ECU 50 reads the air amount accumulated in a different routine as the accumulated intake air amount egasam. If it is determined in step S116 that the accumulated intake air amount egasam is equal to or less than the set value egasam1, i.e., if it is determined that a constant amount of exhaust gas necessary to stabilize the catalyst is not flowing into the catalyst 38, then step S102 is executed again.

If it is determined in step S116 that the accumulated intake air amount egasam is greater than the set value egasam1, i.e., if it is determined that a constant amount of exhaust gas is flowing into the catalyst 38, then it is determined whether control for determining catalyst degradation can continue (step S118). If it is determined in step S118 that the control for determining catalyst degradation can not continue, the control ends.

If it is determined in step S118 that the control for determining catalyst degradation can continue, however, then it is next determined whether the oxygen sensor output gaoxs is less than the reference value gaoxs0 (step S121). In step S121, it is determined whether the air-fuel ratio of the exhaust gas flowing through the catalyst 38 is lean. Here, an environment in which it is extremely difficult for the oxygen releasing reaction to occur in the catalyst 38 is created because the change width in step S104 is set small. This kind of environment usually results in the reaction rate of the oxygen releasing reaction in the catalyst drastically decreasing not only in a degraded catalyst but also in a normal catalyst such that the air-fuel ratio of the exhaust gas flowing through the catalyst 38 becomes lean and the oxygen sensor output gaoxs falls below the reference value gaoxs0. If it is determined in step S121 that the oxygen sensor output gaoxs is equal to or greater than the reference value gaoxs0, i.e., if it is determined that the air-fuel ratio of the exhaust gas flowing though the catalyst 38 is rich, then step S102 is executed again to change that air-fuel ratio from rich to lean.

If it is determined in step S121 that the oxygen sensor output gaoxs is less than the degradation determining reference value gaoxs0, i.e., if it is determined that the air-fuel ratio of the exhaust gas flowing through the catalyst 38 is lean, then the change width eabyfrefd of the target air-fuel ratio starts to be increased (step S140). In step S140, the ECU 50 reads the value for the rate of increase eabyfrefgu in the change width, which is set beforehand. Increasing the change width of the target air-fuel ratio increases the concentration of the reducing gas flowing into the catalyst 38, thereby creating an environment in which an oxygen releasing reaction can easily occur in the catalyst 38.

Next it is determined whether the oxygen sensor output is changing in synchronization with the change in the target air-fuel ratio (step S124), just as in step S114 described above. If it is determined in step S124 that the oxygen sensor output is changing, i.e., if it is determined that the catalyst 38 is degrading abnormally, then the check lamp provided in the vehicle is illuminated (step S136).

If, on the other hand, it is determined in step S124 that the oxygen sensor output is not changing, i.e., if it is determined that the catalyst 38 is not degrading abnormally, then it is determined whether the oxygen sensor output gaoxs is greater than the reference value gaoxs0 (step S142). In step S142 it is determined whether the air-fuel ratio of the exhaust gas flowing through the catalyst 38 is rich. If it is determined in step S142 that the oxygen sensor output gaoxs is equal to or less than the reference value gaoxs0, i.e., if it is determined that the air-fuel ratio of the exhaust gas flowing through the catalyst 38 is not rich but lean, then it is next determined whether the accumulated intake air amount egasam after the target air-fuel ratio started to be changed is greater than the set value egasam0 (step S128). In step S128, it is determined whether the change width of the target air-fuel ratio is large enough to be able to determine that the catalyst is degraded.

If it is determined in step S128 that the accumulated intake air amount egasam is equal to or less than the set value egasam0, i.e., if it is determined that the change width of the target air-fuel ratio is not sufficiently large, step S118 is executed again. If, on the other hand, it is determined in step S128 that the accumulated intake air amount egasam is greater than the set value egasam0, then it is determined that the change width of the target air-fuel ratio is sufficiently large. That is, it is determined that the degree of catalyst degradation is large because the air-fuel ratio of the exhaust gas flowing through the catalyst 38 is lean despite the fact that the change width of the target air-fuel ratio is sufficiently large. In this case, the check lamp provided in the vehicle is illuminated (step S136) and the control for determining catalyst degradation ends (step S138) without waiting for the oxygen sensor output gaoxs to become larger than the set value gaoxs0, i.e., without waiting for the air-fuel ratio of the exhaust gas flowing through the catalyst 38 to reverse to rich.

If it is determined in step S142 that the oxygen sensor output gaoxs is larger than the reference value gaoxs0, i.e., if it is determined that the air-fuel ratio of the exhaust gas flowing through the catalyst 38 is rich, then an accumulated intake air amount egasum2 from after the change width of the target air-fuel ratio starts to be increased until it is determined that the oxygen sensor output gaoxs is larger than the reference value gaoxs0 is calculated (step S144). The ECU 50 can read the air amount accumulated in a different routine as the accumulated intake air amount egasum2. Next, the degree of catalyst degradation corresponding to the accumulated intake air amount egasum2 is calculated by referencing a map stored beforehand in the ECU 50 (step S146). In this map, the degree of catalyst degradation is set to increase the larger the accumulated intake air amount egasum2. Accordingly, the degree of catalyst degradation can be accurately obtained based on the accumulated intake air amount egasum2.

Moreover, it is determined whether the accumulated intake air amount egasum2 is greater than the catalyst degradation determining reference value egasumn (step S148). If it is determined in step S148 that the accumulated intake air amount egasum2 is greater than the catalyst degradation determining reference value egasumn, then it is determined that the degree of catalyst degradation is large. In this case, the check lamp provided in the vehicle is illuminated (step S136) and then the control for determining catalyst degradation ends (step S138). If, on the other hand, it is determined in step S148 that the accumulated intake air amount egasum2 is equal to or less than the catalyst degradation determining reference value egasumn, then it is determined that the degree of catalyst degradation is within the allowable limit. In this case, the control for determining catalyst degradation is cancelled without illuminating the check lamp (step S138).

As described above, in the routine illustrated in FIG. 9, the change width eabyfrefd of the target air-fuel ratio is gradually increased and the accumulated intake air amount egasum2 from the start of that increase until the oxygen sensor output gaoxs reverses is calculated. Degradation of the catalyst can then be determined based on that calculated accumulated intake air amount egasum2. Thus, degradation of the catalyst 38 can be accurately determined without that determination being based on the oxygen storage capacity of the catalyst. Furthermore, a catalyst with a large degree of degradation can also be accurately detected.

Fourth Example Embodiment

Next, a fourth example embodiment of the invention will be described with reference to FIGS. 10 and 11. The system of this fourth example embodiment can be realized by using the hardware structure shown in FIG. 1 and having the ECU 50 execute the routine illustrated in FIG. 11 which will be described later.

FIG. 10 is a view illustrating a method for determining catalyst degradation according to the fourth example embodiment of the invention. More specifically, FIG. 10A shows the change in the target air-fuel ratio, while FIG. 10B shows the change in the oxygen sensor output following the change in the target air-fuel ratio. In the fourth example embodiment, the target air-fuel ratio is first changed in periods that are sufficiently shorter than a period which is long enough for a normal catalyst to become saturated with oxygen while the air-fuel ratio of exhaust gas is kept lean within the same period but longer than the change period in the first example embodiment. The amount of reducing gas flowing into the catalyst increases the longer the change period of the target air-fuel ratio, which creates an environment in which oxygen readily releases from the catalyst. After a fixed period of time has passed after the target air-fuel ratio starts to change, the change period of the target air-fuel ratio is gradually shortened, as shown in FIG. 10A. Gradually shortening the change period in this way reduces the amount of reducing gas flowing into the catalyst, which creates an environment in which oxygen does not readily release from the catalyst. By producing this kind of environment, not only a degraded catalyst but also a normal catalyst will soon become saturated with oxygen such that the air-fuel ratio of the exhaust gas flowing through the catalyst will become lean. As described above, however, the decrease in the reaction rate of the oxygen releasing reaction is greater in a degraded catalyst than it is in a normal catalyst, i.e., the difference between the reaction rates of the oxygen absorbing reaction and the oxygen releasing reaction is greater in a degraded catalyst than it is in a normal catalyst. Therefore, a degraded catalyst will become saturated with oxygen sooner than a normal catalyst will. As a result, as shown in FIG. 10B, the time at which the oxygen sensor output reverses from a rich output to a lean output is earlier in a degraded catalyst (i.e., t5) than it is in a normal catalyst (i.e., t6). Also, the time at which the oxygen sensor output reverses is earlier in a catalyst with a large degree of degradation than it is in catalyst with a small degree of degradation.

Accordingly, the fourth example embodiment makes it possible to accurately determine catalyst degradation by gradually shortening the change period of the target air-fuel ratio and detecting the time at which the oxygen sensor output reverses from a rich output to a lean output. Moreover, the degree of catalyst degradation can be accurately detected based on the point at which the oxygen sensor output reverses.

[Specific Steps in the Fourth Example Embodiment]

Figure 11A:
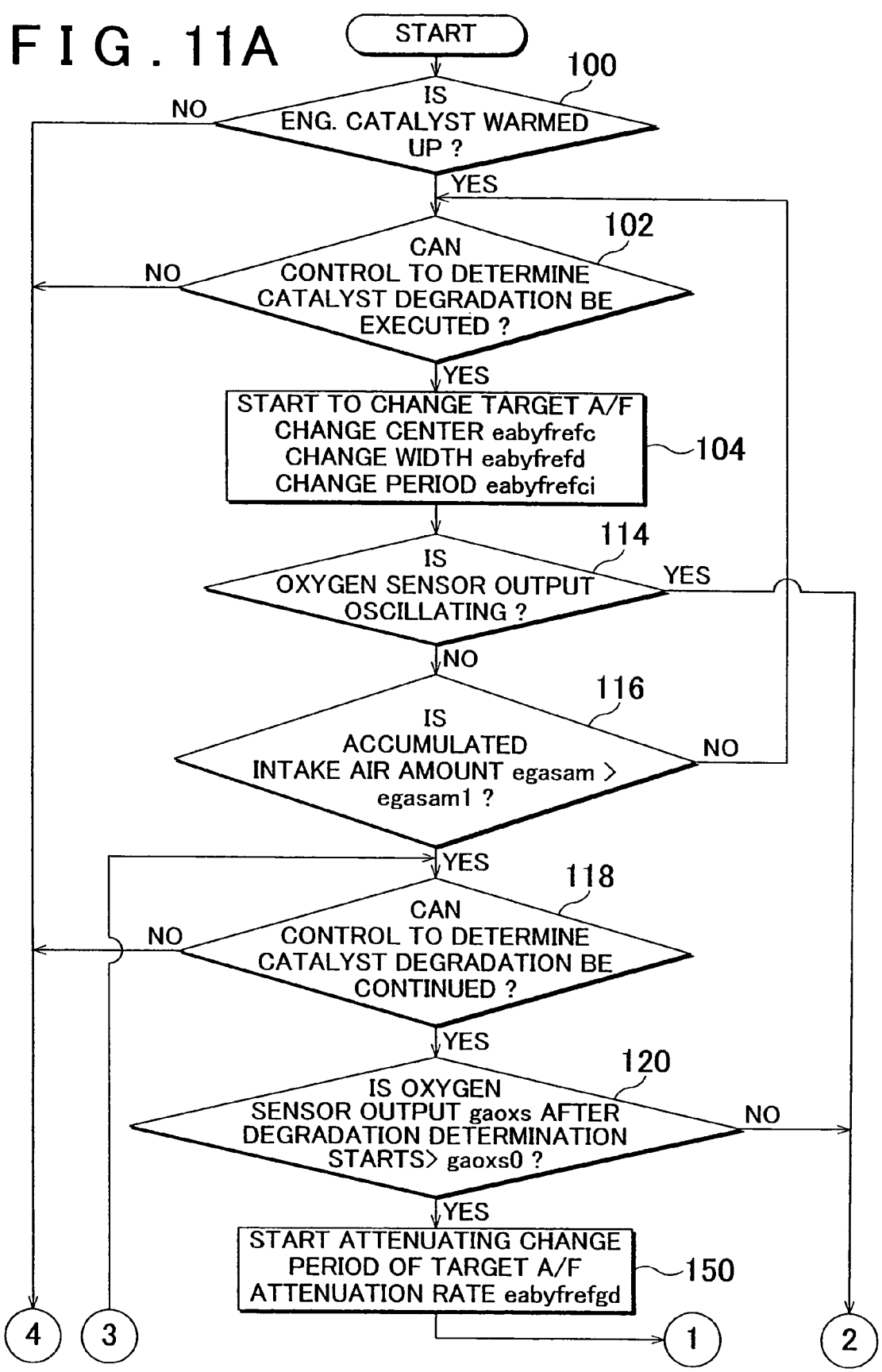
FIG. 11 is a flowchart illustrating control for determining catalyst degradation which is executed by an ECU in the fourth example embodiment of the invention.
Figure 11B:
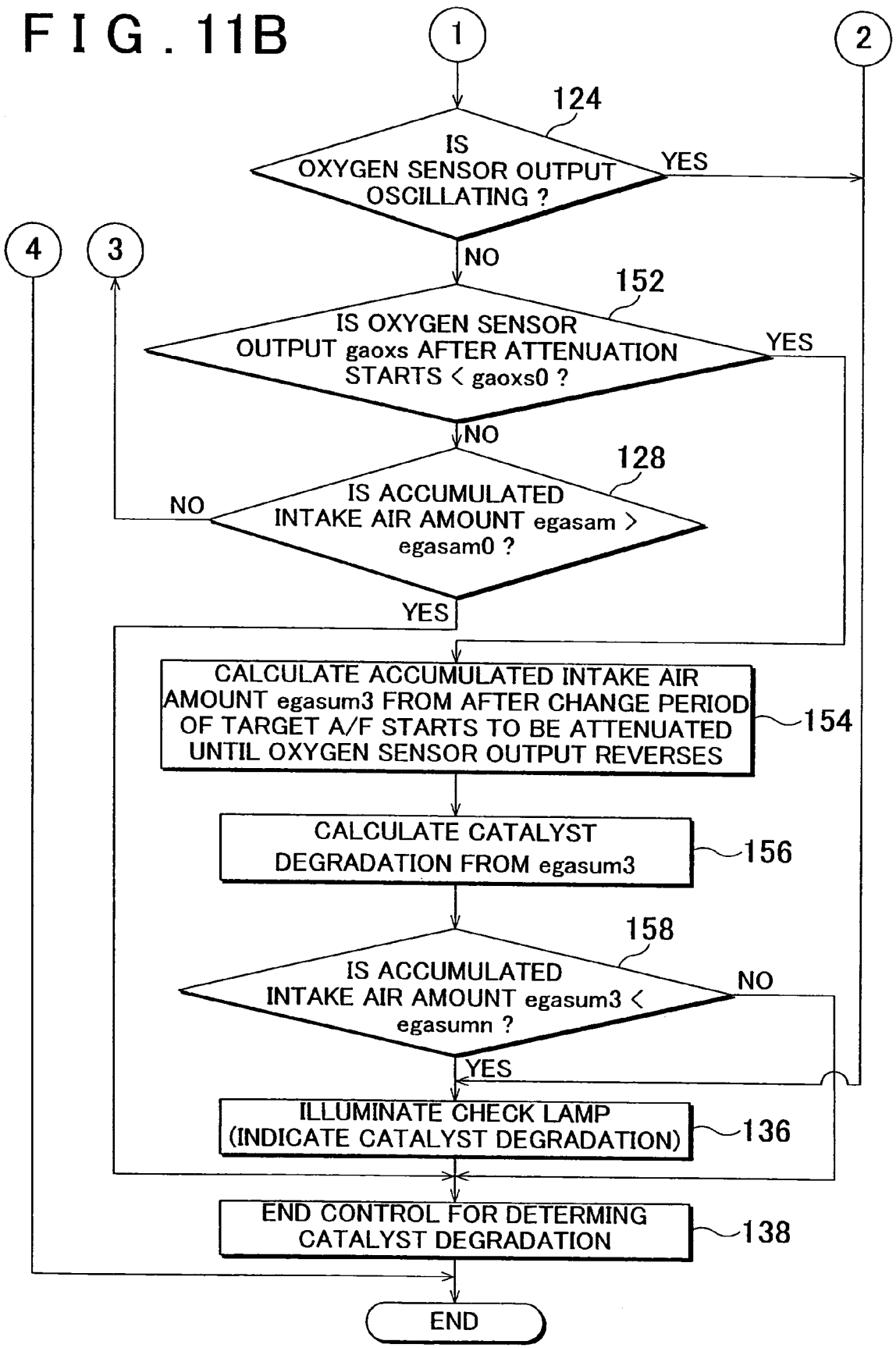

FIG. 11 is a flowchart illustrating control for determining catalyst degradation which is executed by the ECU 50 according to the fourth example embodiment of the invention. In the flowchart shown in the drawing, if it is first determined in step S100 that warm-up is complete and then determined in step S102 that the control for determining catalyst degradation can be executed, then the target air-fuel ratio starts to be changed (step S104), just like in the first example embodiment. Here, the change period eabyfrefci read by the ECU 50 is a value that is indicative of a longer period than the change period read in step S104 in the flowchart illustrated in FIG. 5. Accordingly, the target air-fuel ratio is controlled at a change period that is sufficiently shorter than the period which is long enough for a normal catalyst to become saturated with oxygen while the air-fuel ratio of exhaust gas is kept lean within the same period but longer than the change period in the first example embodiment.

Next it is determined whether the oxygen sensor output is changing in synchronization with the change in the target air-fuel ratio (step S114), just as in the second example embodiment. If it is determined in step S114 that the oxygen sensor output is changing, i.e., if it is determined that the catalyst 38 is degrading abnormally, then the check lamp provided in the vehicle is illuminated (step S136) and the control for determining catalyst degradation ends (step S138).

If, on the other hand, it is determined in step S114 that the oxygen sensor output is not changing, i.e., if it is determined that the catalyst 38 is not degrading abnormally, then it is determined whether the accumulated intake air amount egasam after the target air-fuel ratio started to be changed is greater than a set value egasam1 (step S116). The ECU 50 reads the air amount accumulated in a different routine as the accumulated intake air amount egasam. If it is determined in step S116 that the accumulated intake air amount egasam is equal to or less than the set value egasam1, i.e., if it is determined that a constant amount of exhaust gas necessary to stabilize the catalyst is not flowing into the catalyst 38, then step S102 is executed again.

If it is determined in step S116 that the accumulated intake air amount egasam is greater than the set value egasam1, i.e., if it is determined that a constant amount of exhaust gas is flowing into the catalyst 38, then it is determined whether control for determining catalyst degradation can continue (step S118). If it is determined in step S118 that the control for determining catalyst degradation can not continue, the control ends.

If it is determined in step S118 that the control for determining catalyst degradation can continue, however, then it is next determined whether the oxygen sensor output gaoxs is greater than the reference value gaoxs0 (step S120). In step S120, it is determined whether the air-fuel ratio of the exhaust gas flowing through the catalyst 38 is rich. If it is determined in step S120 that the oxygen sensor output gaoxs is equal to or less than the reference value gaoxs0, i.e., if it is determined that the air-fuel ratio of the exhaust gas flowing though the catalyst 38 is lean, then it is determined that the catalyst has become saturated with oxygen early. In this case as well, the check lamp provided in the vehicle is illuminated (step S136) because the degree of catalyst degradation is large.

If it is determined in step S120 that the oxygen sensor output gaoxs is greater than the degradation determining reference value gaoxs0, i.e., if it is determined that the air-fuel ratio of the exhaust gas flowing through the catalyst 38 is rich, then the change period eabyfrefci of the target air-fuel ratio starts to be attenuated (step S150). In step S150, the ECU 50 reads the value for the attenuation rate eabyfrefcd of the change period, which is set beforehand. Attenuating the change period of the target air-fuel ratio reduces the amount of the reducing gas flowing into the catalyst 38, thereby creating an environment in which an oxygen releasing reaction does not readily occur in the catalyst 38.

Next it is determined whether the oxygen sensor output is changing in synchronization with the change in the target air-fuel ratio (step S124), just as in step S114 described above. If it is determined in step S124 that the oxygen sensor output is changing, i.e., if it is determined that the catalyst 38 is degrading abnormally, then the check lamp provided in the vehicle is illuminated (step S136).

If, on the other hand, it is determined in step S124 that the oxygen sensor output is not changing, i.e., if it is determined that the catalyst 38 is not degrading abnormally, then it is determined whether the oxygen sensor output gaoxs after the change period of the target air-fuel ratio starts to be attenuated is greater than the reference value gaoxs0 (step S152). In step S152 it is determined whether the air-fuel ratio of the exhaust gas flowing through the catalyst 38 is lean. If it is determined in step S152 that the oxygen sensor output gaoxs is equal to or greater than the reference value gaoxs0, i.e., if it is determined that the air-fuel ratio of the exhaust gas flowing through the catalyst 38 is not lean but rich, then it is next determined whether the accumulated intake air amount egasam after the target air-fuel ratio starts to change is greater than the set value egasam0 (step S128). The ECU 50 reads the amount of intake air accumulated in a different routine as the accumulated intake air amount egasam. In step S128, it is determined whether the change period of the target air-fuel ratio is short enough to be able to determine that the catalyst is normal.

If it is determined in step S128 that the accumulated intake air amount egasam is equal to or less than the set value egasam0, i.e., if it is determined that the change period of the target air-fuel ratio is not sufficiently short, then step S118 is executed again. If, on the other hand, it is determined in step S128 that the accumulated intake air amount egasam is greater than the set value egasam0, then it is determined that the change period of the target air-fuel ratio is sufficiently short. That is, it is determined that the degree of catalyst degradation is small because the air-fuel ratio of the exhaust gas flowing through the catalyst 38 is rich despite the fact that the change period of the target air-fuel ratio is sufficiently short. In this case, the control for determining catalyst degradation ends (step S138) without waiting for the oxygen sensor output gaoxs to become smaller than the set value gaoxs0, i.e., without waiting for the air-fuel ratio of the exhaust gas flowing through the catalyst 38 to change from rich to lean.

If it is determined in step S152 that the oxygen sensor output gaoxs is less than the reference value gaoxs0, i.e., if it is determined that the air-fuel ratio of the exhaust gas flowing through the catalyst 38 is lean, then an accumulated intake air amount egasum3 from after the change period of the target air-fuel ratio starts to be attenuated until it is determined that the oxygen sensor output gaoxs is smaller than the reference value gaoxs0 is calculated (step S154). The ECU 50 can read the air amount accumulated in a different routine as the accumulated intake air amount egasum3.

Next, the degree of catalyst degradation corresponding to the accumulated intake air amount egasum3 is calculated by referencing a map stored beforehand in the ECU 50 (step S156). In this map, the degree of catalyst degradation is set to increase the smaller the accumulated intake air amount egasum3. Accordingly, the degree of catalyst degradation can be accurately obtained based on the accumulated intake air amount egasum3. Moreover, it is determined whether the accumulated intake air amount egasum3 is smaller than the catalyst degradation determining reference value egasumn (step S158). If it is determined in step S158 that the accumulated intake air amount egasum3 is smaller than the catalyst degradation determining reference value egasumn, then it is determined that the catalyst is degraded. In this case, the check lamp provided in the vehicle is illuminated (step S136) and then the control for determining catalyst degradation ends (step S138). If, on the other hand, it is determined in step S158 that the accumulated intake air amount egasum3 is equal to or greater than the catalyst degradation determining reference value egasumn, then it is determined that the degree of catalyst degradation is within the allowable limit. In this case, the control for determining catalyst degradation is cancelled without illuminating the check lamp (step S138).

As described above, in the routine illustrated in FIG. 11, the change period eabyfrefci of the target air-fuel ratio is gradually attenuated and the accumulated intake air amount egasum3 from the start of that attenuation until the oxygen sensor output gaoxs reverses is calculated. Degradation of the catalyst can then be determined based on that calculated accumulated intake air amount egasum3. Thus, degradation of the catalyst 38 can be accurately determined without that determination being based on the oxygen storage capacity of the catalyst. Furthermore, a catalyst with a large degree of degradation can also be accurately detected.

Fifth Example Embodiment

Next, a fifth example embodiment of the invention will be described with reference to FIGS. 12 and 13. The system of this fifth example embodiment can be realized by using the hardware structure shown in FIG. 1 and having the ECU 50 execute the routine illustrated in FIG. 13 which will be described later.

[Characteristics of the Fifth Example Embodiment]

FIG. 12 is a view illustrating a method for determining catalyst degradation according to the fifth example embodiment of the invention. More specifically, FIG. 12A shows the change in the target air-fuel ratio, while FIG. 12B shows the change in the oxygen sensor output following the change in the target air-fuel ratio. In the fourth example embodiment described above, an environment is gradually created in which oxygen does not readily release from the catalyst by gradually shortening the change period of the target air-fuel ratio, and the point at which the oxygen sensor output reverses from a rich output to a lean output is detected.

In this fifth example embodiment, the target air-fuel ratio is first changed in periods that are sufficiently shorter than a period which is long enough for a normal catalyst to become saturated with oxygen while the air-fuel ratio of exhaust gas is kept lean within the same period. Here, the change period is preferably even shorter than the change period in the first example embodiment. As described above, an environment in which oxygen does not readily release from the catalyst is created because the amount of reducing gas flowing into the catalyst decreases the shorter the change period of the target air-fuel ratio. Therefore, not only a degraded catalyst but also a normal catalyst will become saturated with oxygen such that the oxygen sensor will start to produce a lean output. After the oxygen sensor starts to produce a lean output in this way, i.e., after a fixed period of time has passed after the target air-fuel ratio starts to change, the change period of the target air-fuel ratio is gradually lengthened, as shown in FIG. 12A. Gradually lengthening the change period in this way gradually creates an environment in which oxygen readily releases from the catalyst. As a result, the reaction rate of the oxygen releasing reaction in the catalyst gradually increases. However, the reaction rate of the oxygen releasing reaction is slower in a degraded catalyst than it is in a normal catalyst, i.e., the difference between the reaction rates of the oxygen absorbing reaction and the oxygen releasing reaction is greater in a degraded catalyst than it is in a normal catalyst. Therefore, a normal catalyst releases oxygen faster and thus recovers sooner from oxygen saturation than does a degraded catalyst. As a result, as shown in FIG. 12B, the time at which the oxygen sensor output reverses from a lean output to a rich output is earlier in a normal catalyst (i.e., t7) than it is in a degraded catalyst (i.e., t8). Also, the time at which the oxygen sensor output reverses is earlier in a catalyst with a small degree of degradation than it is in catalyst with a large degree of degradation.

Accordingly, the fifth example embodiment makes it possible to accurately determine the degradation of a catalyst by gradually lengthening the change period of the target air-fuel ratio and detecting the time at which the oxygen sensor output reverses from a lean output to a rich output. Moreover, the degree of catalyst degradation can be accurately detected based on the point at which the oxygen sensor output reverses. In addition, a catalyst with a large degree of degradation can be accurately detected.

[Specific Steps in the Fifth Example Embodiment]

Figure 13A:
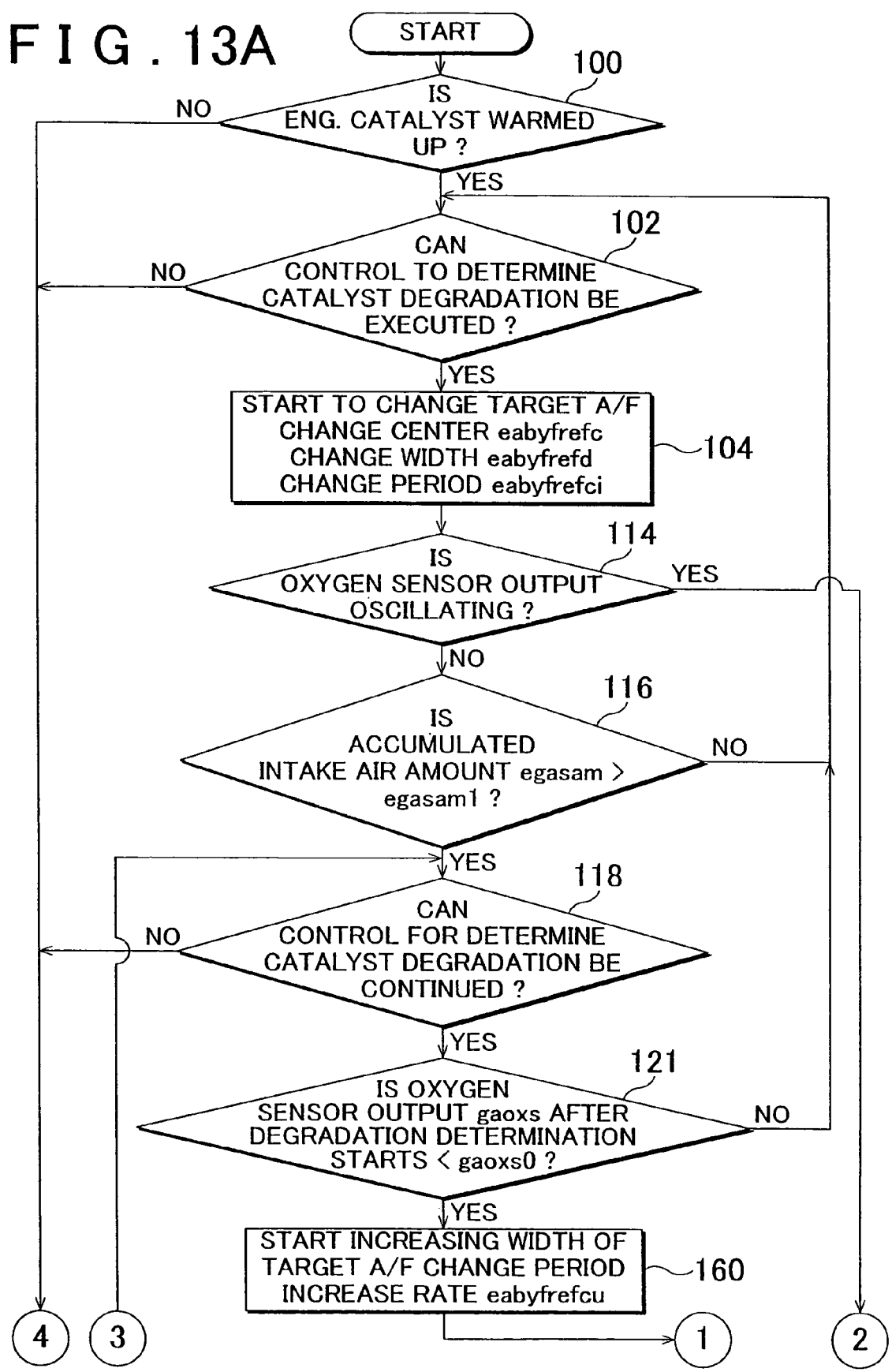
FIG. 13 is a flowchart illustrating control for determining catalyst degradation which is executed by an ECU in the fifth example embodiment of the invention.
Figure 13B:
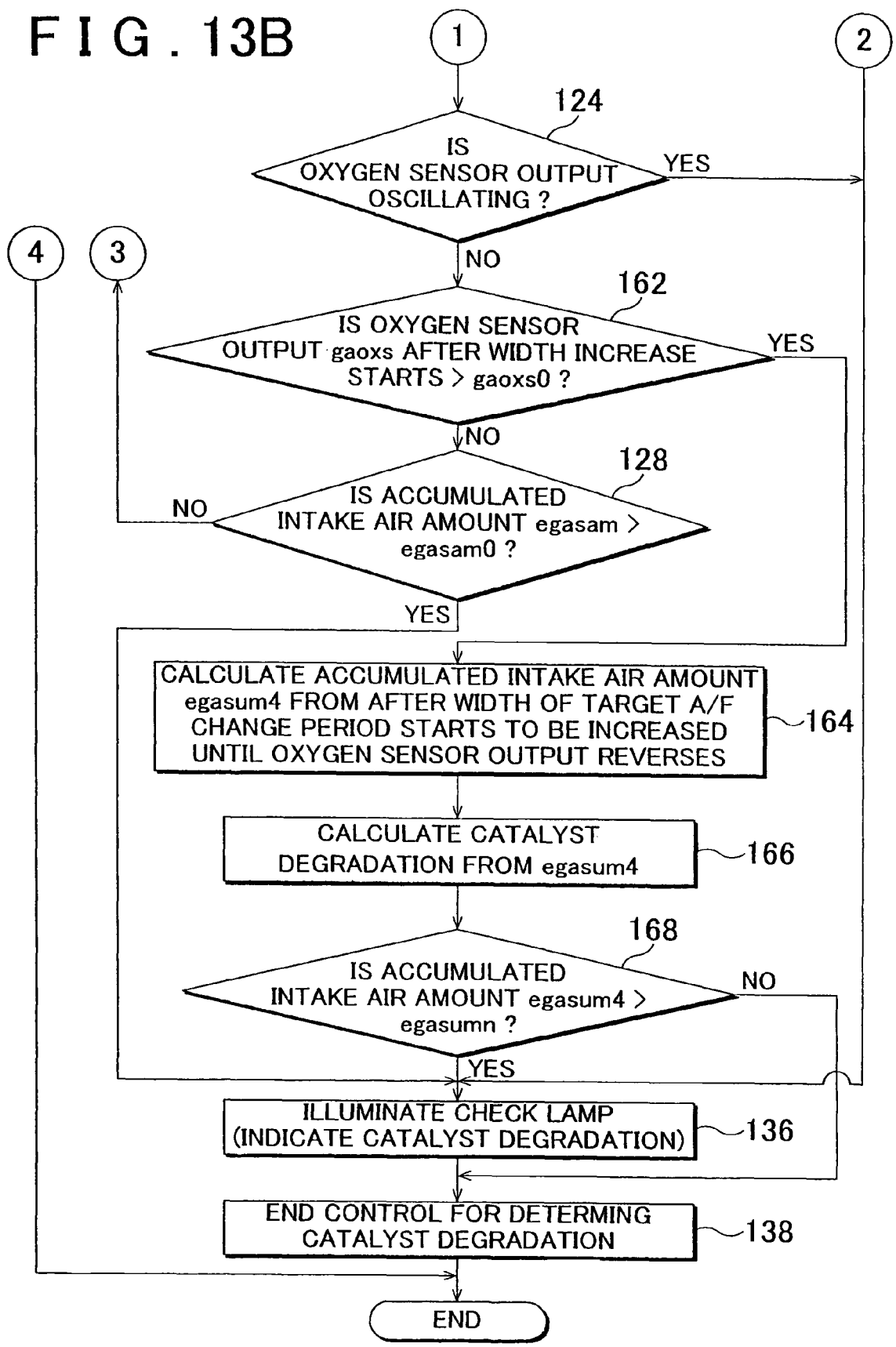

FIG. 13 is a flowchart illustrating control for determining catalyst degradation which is executed by the ECU 50 according to the fifth example embodiment of the invention. In the flowchart shown in the drawing, if it is first determined in step S100 that warm-up is complete and then determined in step S102 that the control for determining catalyst degradation can be executed, the target air-fuel ratio starts to be changed (step S104), just like in the first example embodiment. Here, the change period eabyfrefci read by the ECU 50 is a value indicative of a shorter period than the change period read in step S104 in the flowchart illustrated in FIG. 5. Accordingly, the target air-fuel ratio is controlled at a change period that is shorter than the change period in the first example embodiment.

Next it is determined whether the oxygen sensor output is changing in synchronization with the change in the target air-fuel ratio (step S114), just as in the second example embodiment. If it is determined in step S114 that the oxygen sensor output is changing, i.e., if it is determined that the catalyst 38 is degrading abnormally, then the check lamp provided in the vehicle is illuminated (step S136) and the control for determining catalyst degradation ends (step S138). If, on the other hand, it is determined in step S114 that the oxygen sensor output is not changing, i.e., if it is determined that the catalyst 38 is not degrading abnormally, then it is determined whether the accumulated intake air amount egasam after the target air-fuel ratio starts to be changed is greater than the set value egasam1 (step S116). The ECU 50 reads the air amount accumulated in a different routine as the accumulated intake air amount egasam. If it is determined in step S116 that the accumulated intake air amount is equal to or less than the set value egasam1, i.e., if it is determined that a constant amount of exhaust gas necessary to stabilize the catalyst is not flowing into the catalyst 38, then step S102 is executed again.

If it is determined in step S116 that the accumulated intake air amount egasam is greater than the set value egasam1, i.e., if it is determined that a constant amount of exhaust gas is flowing into the catalyst 38, then it is determined whether control for determining catalyst degradation can continue (step S118). If it is determined in step S118 that the control for determining catalyst degradation can not continue, the control ends.

If it is determined in step S118 that the control for determining catalyst degradation can continue, however, then it is next determined whether the oxygen sensor output gaoxs is less than the reference value gaoxs0 (step S121). In step S121, it is determined whether the air-fuel ratio of the exhaust gas flowing through the catalyst 38 is lean. Here, an environment in which it is extremely difficult for an oxygen releasing reaction to occur in the catalyst 38 is created because of the short change period set in step S104. As a result, the reaction rate of the oxygen releasing reaction in the catalyst usually drastically decreases not only in a degraded catalyst but also in a normal catalyst, so the air-fuel ratio of the exhaust gas flowing through the catalyst 38 becomes lean and the oxygen sensor output gaoxs falls below the reference value gaoxs0. If it is determined in step S121 that the oxygen sensor output gaoxs is equal to or greater than the reference value gaoxs0, i.e., if it is determined that the air-fuel ratio of the exhaust gas flowing though the catalyst 38 is rich, then step S102 is executed again to reverse that air-fuel ratio to lean.

If it is determined in step S121 that the oxygen sensor output gaoxs is less than the degradation determining reference value gaoxs0, i.e., if it is determined that the air-fuel ratio of the exhaust gas flowing through the catalyst 38 is lean, then the width of the change period eabyfrefci of the target air-fuel ratio starts to be increased (step S160). In step S160, the ECU 50 reads the value for the rate of width increase eabyfrefcu in the change period, which is set beforehand. Increasing the width of the change period of the target air-fuel ratio increases the amount of the reducing gas flowing into the catalyst 38, thereby creating an environment in which an oxygen releasing reaction can easily occur in the catalyst 38.

Next it is determined whether the oxygen sensor output is changing in synchronization with the change in the target air-fuel ratio (step S124), just as in step S114 described above. If it is determined in step S124 that the oxygen sensor output is changing, i.e., if it is determined that the catalyst 38 is degrading abnormally, then the check lamp provided in the vehicle is illuminated (step S136).

If, on the other hand, it is determined in step S124 that the oxygen sensor output is not changing, i.e., if it is determined that the catalyst 38 is not degrading abnormally, then it is determined whether the oxygen sensor output gaoxs after the width of the change period of the target air-fuel ratio started to be increased is greater than the reference value gaoxs0 (step S162). In step S162 it is determined whether the air-fuel ratio of the exhaust gas flowing through the catalyst 38 is rich. If it is determined in step S162 that the oxygen sensor output gaoxs is equal to or less than the reference value gaoxs0, i.e., if it is determined that the air-fuel ratio of the exhaust gas flowing through the catalyst 38 is not rich but lean, then it is next determined whether the accumulated intake air amount egasam after the target air-fuel ratio started to be changed is greater than the set value egasam0 (step S128). The ECU 50 reads the air amount accumulated in a different routine as the accumulated intake air amount egasam. In step S128, it is determined whether the change period of the target air-fuel ratio is long enough to be able to determine that the catalyst is degraded.

If it is determined in step S128 that the accumulated intake air amount egasam is equal to or less than the set value egasam0, i.e., if it is determined that the change period of the target air-fuel ratio is not sufficiently long, then step S118 is executed again. If, on the other hand, it is determined in step S128 that the accumulated intake air amount egasam is greater than the set value egasam0, then it is determined that the change period of the target air-fuel ratio is sufficiently long. That is, it is determined that the degree of catalyst degradation is large because the air-fuel ratio of the exhaust gas flowing through the catalyst 38 is lean despite the fact that the change period of the target air-fuel ratio is sufficiently long. In this case, the check lamp provided in the vehicle is illuminated (step S136) and the control for determining catalyst degradation ends (step S138) without waiting for the oxygen sensor output gaoxs to become larger than the set value gaoxs0, i.e., without waiting for the air-fuel ratio of the exhaust gas flowing through the catalyst 38 to change from lean to rich.

If it is determined in step S162 that the oxygen sensor output gaoxs is larger than the reference value gaoxs0, i.e., if it is determined that the air-fuel ratio of the exhaust gas flowing through the catalyst 38 is rich, then an accumulated intake air amount egasum4 from after the width of the change period of the target air-fuel ratio starts to be increased until it is determined that the oxygen sensor output gaoxs is larger than the reference value gaoxs0 is calculated (step S164). The ECU 50 can read the air amount accumulated in a different routine as the accumulated intake air amount egasum4.

Next, the degree of catalyst degradation corresponding to the accumulated intake air amount egasum4 is calculated by referencing a map stored beforehand in the ECU 50 (step S166). In this map, the degree of catalyst degradation is set to increase the larger the accumulated intake air amount egasum4. Accordingly, the degree of catalyst degradation can be accurately obtained based on the accumulated intake air amount egasum4. Moreover, it is determined whether the accumulated intake air amount egasum4 is greater than the catalyst degradation determining reference value egasumn (step S168). If it is determined in step S168 that the accumulated intake air amount egasum4 is greater than the catalyst degradation determining reference value egasumn, then it is determined that the degree of catalyst degradation is large. In this case, the check lamp provided in the vehicle is illuminated (step S136) and then the control for determining catalyst degradation ends (step S138). If, on the other hand, it is determined in step S168 that the accumulated intake air amount egasum4 is equal to or less than the catalyst degradation determining reference value egasumn, then it is determined that the degree of catalyst degradation is within the allowable limit. In this case, the control for determining catalyst degradation ends without illuminating the check lamp (step S138).

As described above, in the routine illustrated in FIG. 13, the width of the change period eabyfrefci of the target air-fuel ratio is gradually increased and the accumulated intake air amount egasum4 from the start of that increase until the oxygen sensor output gaoxs reverses is calculated. Degradation of the catalyst can then be determined based on that calculated accumulated intake air amount egasum4. Thus, degradation of the catalyst 38 can be accurately determined without having to calculate the oxygen storage capacity of the catalyst. Furthermore, a catalyst with a large degree of degradation can also be accurately detected.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An apparatus that determines degradation of a catalyst provided in an exhaust passage of an internal combustion engine, comprising:
    an exhaust gas sensor which is provided downstream of the catalyst and detects whether an air-fuel ratio of exhaust gas is richer or leaner than a stoichiometric air-fuel ratio;
    an air-fuel ratio controller that changes a target air-fuel ratio of exhaust gas back and forth between rich and lean around a value that is richer than the stoichiometric air-fuel ratio in a period that is shorter than a period which is long enough for a normal catalyst to become saturated with oxygen; and
    a catalyst degradation determiner which determines that the catalyst is degraded when the exhaust gas sensor detects that the air-fuel ratio is lean for a predetermined period of time after the target air-fuel ratio started to be changed.

2. The apparatus according to claim 1, wherein the air-fuel ratio controller changes the target air-fuel ratio when the amount of air drawn into the internal combustion engine is equal to or less than a predetermined value.

* * * * *